United States Patent [19]
Watanabe et al.

[11] Patent Number: 5,754,320
[45] Date of Patent: May 19, 1998

[54] OPTICAL CROSS-CONNECT SYSTEM

[75] Inventors: Atsushi Watanabe, Yokohama; Masafumi Koga, Yokosuka; Ken-ichi Sato, Yokohama, all of Japan

[73] Assignee: Nippon Telegraph and Telephone Corporation, Tokyo, Japan

[21] Appl. No.: 698,052

[22] Filed: Aug. 15, 1996

[30] Foreign Application Priority Data

Aug. 18, 1995 [JP] Japan ................... 7-210867
Mar. 19, 1996 [JP] Japan ................... 8-063554

[51] Int. Cl.$^6$ ................... H04J 14/00; H04J 14/02
[52] U.S. Cl. ................... 359/117; 359/128; 359/121; 385/17; 385/24
[58] Field of Search ................... 359/117, 120–121, 359/128, 178, 129–130, 133, 176; 385/17, 24

[56] References Cited

U.S. PATENT DOCUMENTS 5,241,409  8/1993  Hill et al. ................... 359/128
5,694,499  12/1997  Tillerot et al. ................... 385/24

FOREIGN PATENT DOCUMENTS 8-36195  2/1996  Japan.

OTHER PUBLICATIONS

A. Watanabe et al., "Optical Path Cross–Connect Node Architecture with High Modularity for Photonic Transport Networks", IEICE Trans. Commun., E77–B(10):1220–1229 (1994).
M. Okuno et al., "8×8 Optical Matrix Switch Using Silica–Based Planar Lightwave Circuits", IEICE Trans. Electron., E76–C(7):1215–1223 (1993).
R. Naqase et al., "Silica–Based 8×8 Optical–Matrix Switch Module with Hybrid Integrated Driving Circuits", ECOC '93 Mopl.2 pp. 17–20 (1993).
W. Horsthuis et al., "Active Components for Optical Networks Using Polymer Technology", IOOC '95, pp. 62–24 (1995).
"Solid State Optical Switches Newsletter", Akzo Nobel Corp., 1995.
T. Mizuochi et al., "Frequency Stabilized 622–Mb/s 16–Channel Optical FDM System and Its Performance in 1.3/1.55–μm Zero–Dispersion Fiber Transmission", J. Lightwave Tech., 13(10):1937–1947 (1995).
M. Koga et al., "8×16 Delivery–and–Coupling–Type Optical Switches for a 320–Gbit/s Throughput Optical Path Cross–Connect System", OFC '96 Tech. Digest., pp. 259–261 (1996).
A. Jourdan et al., "Experimental Assessment of a 4×4 Four–Wavelength All–Optical Cross–Connect at a 10–Gbit/s Line Rate", OFC '95 Tech. Digest, (1995).
M. Koga et al., "Design and Performance of an Optical Path Cross–Connect System Based on Wavelength Path Concept", J. Lightwave Tech., 14(6):1106–1119 (1996).

*Primary Examiner*—Kinfe-Michael Negash
*Attorney, Agent, or Firm*—Finnegan, Henderson, Farabow, Garrett & Dunner, L.L.P.

[57] ABSTRACT

An optical cross-connect system is provided with M fixed wavelength light sources and external modulators corresponding to respective optical paths, serving as light sources for wavelength conversion devices corresponded to M×N optical paths. By means of electrical signals for the converted optical signals carried on the M×N optical paths, CW lights input to the external modulators from the respective light sources are modulated, wavelength converted and then output. Accompanying this wavelength conversion, wavelength multiplexed light sources which can select lights from a plurality of fixed wavelength light sources and output to predetermined output ports, are used for the light sources of the plurality of wavelength conversion devices of the cross-connect system. In this way, the light sources of a plurality of wavelength conversion sections are commonalized using a fixed wavelength light source. As a result wavelength multiplexed light sources which can respectively output lights of optional wavelengths to a plurality of output ports using a plurality of fixed wavelength light sources are realized. Moreover, by using such wavelength division multiplexed communication light sources, then a highly realizable and economical optical cross-connect system is possible.

18 Claims, 14 Drawing Sheets

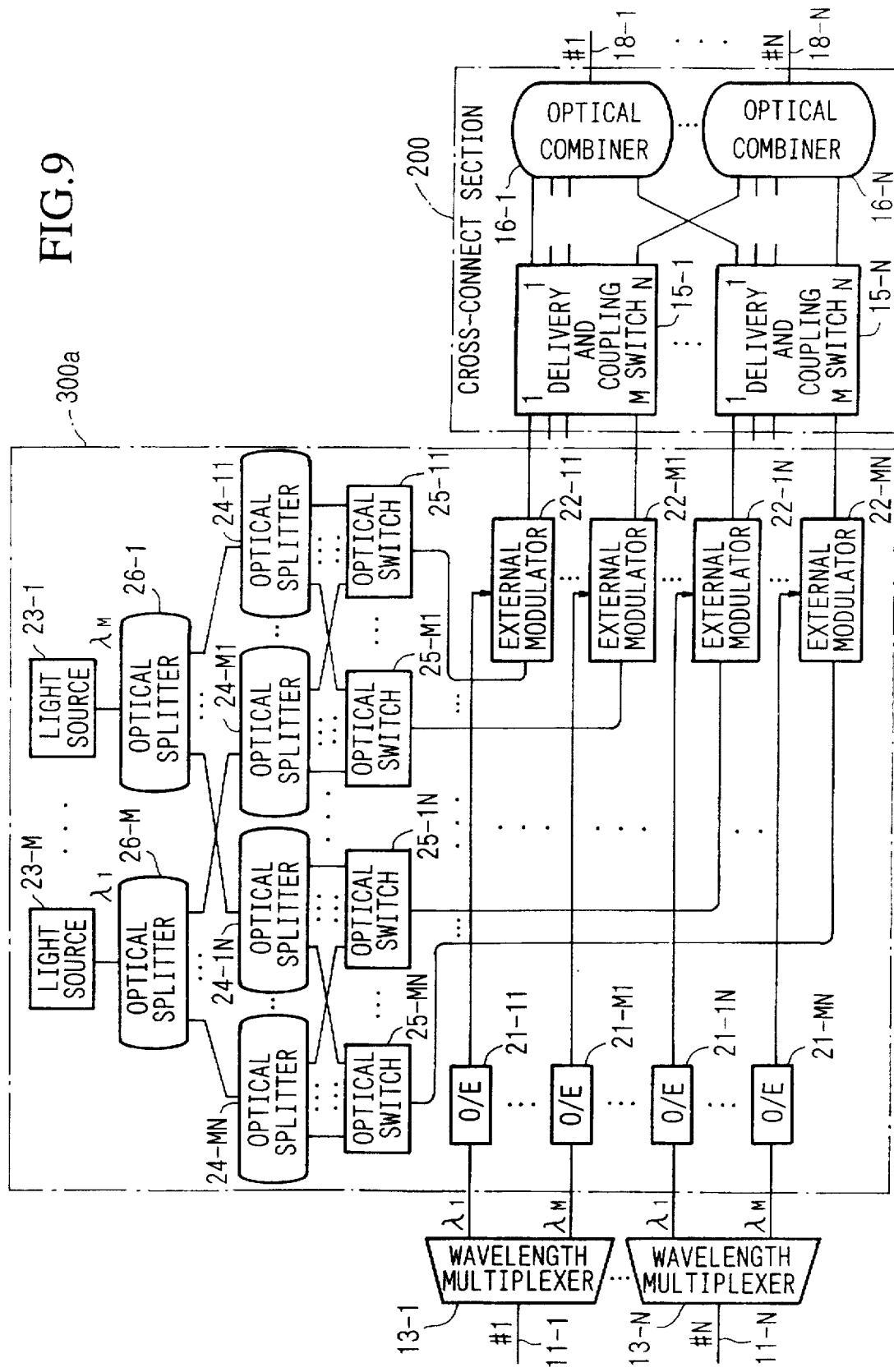

OPTICAL CROSS-CONNECT SYSTEM

BACKGROUND OF THE INVENTION

1. Field of the Invention

The present invention relates to an optical cross-connect system wherein wavelength division multiplexed signals input from a plurality of input optical transmission lines are demultiplexed into signals of respective wavelengths, regenerated or further converted into predetermined wavelengths, and then cross-connected to prescribed output optical transmission lines.

2. Description of the Related Art

Development of optical path cross-connect systems wherein wavelength routing techniques, whereby the optical broadband characteristics are sufficiently restored, are introduced to optical paths, is gaining wide attention. For optical path schemes there is the WP system (wavelength path system; one wavelength used end-to-end) and the VWP system (virtual wavelength path system; wavelength conversion at each node) (refer to: Atsushi WATANABE et al., "Optical Path Cross-Connect Node Architecture with High Modularity for Photonic Transport Networks," IEICE Trans. Commun., Vol. E77-B. No. 10, October 1994).

In the WP optical cross-connect system, wavelength division multiplexed signals input from a plurality of input optical transmission lines are demultiplexed into signals of respective wavelengths, and then cross-connected to prescribed output optical transmission lines. In order to maintain the transmission quality of the optical paths, then with a WP optical cross-connect system, in the case where optical paths passing wavelength multiplexed signals of M wavelengths are received from N different optical fibers, then M×N regeneration circuits for optical regeneration of the respective optical signals are required. However, to provide respective laser sources in the regeneration circuits, then with this example, M×N laser sources are required. Therefore, a cost penalty in the construction of large scale system is unavoidable.

The VWP optical cross-connect system is a system for carrying out wavelength conversion type optical path cross-connection, wherein wavelength division multiplexed signals input from a plurality of input optical transmission lines are demultiplexed into signals of respective wavelengths, further converted into predetermined wavelengths, and then cross-connected to prescribed output optical transmission lines. With the VWP system, since at the time of optical path cross-connection, this is accompanied by wavelength conversion, then as with the above-mentioned example, it is necessary to provide M×N wavelength conversion circuits in the optical cross-connect system. Optical path cross-connection with wavelength conversion has the merit in that the design for accommodating the optical paths can be made simpler than for the above-mentioned optical regeneration type optical path cross-connection, and network resources can be effectively utilized. However, it is a bottleneck in the current technology how wavelength conversion circuits are realized. The wavelength conversion circuit comprises tunable wavelength light sources and/or fixed wavelength light sources. A typical optical device for the tunable wavelength light source is the distributed Brag reflection laser (DBR-LD). However with this device, the usable tunable wavelength region is narrow at 2-3 nm. Furthermore, since the wavelengths are changed in analog fashion by means of an electric current, then problems accompanying instability of the set wavelength arise. Consequently, with the present technology, from the viewpoint of tunable wavelength range, there are difficulties in applying tunable wavelength circuits for tunable wavelength light sources to an optical cross-connect system. On the other hand, when a fixed wavelength output laser source is used, it is necessary to provide light sources for a number of multiplexed wavelengths (in this case M) in the respective wavelength conversion circuits, and hence a large number of laser sources ($M^2 \times N$) are required in the overall optical cross-connect system.

With the conventional optical cross-connect system as described above, then with either the WP system or the VWP system, there is the problem in that a large number of light sources are required. Moreover, if the number of light sources used in the optical cross-connect system is increased, then the size of the system for carrying out monitoring and stabilization control of the wavelengths is also increased so that costs rise. Hence, in order to construct an economical optical cross-connect system, the required number of light sources must be reduced.

SUMMARY OF THE INVENTION

It is an object of the present invention to provide an optical cross-connect system wherein the required number of light sources can be reduced compared to before.

According to a first aspect of the present invention there is provided an optical cross-connect system comprising:

wavelength demultiplexers for demultiplexing wavelength division multiplexed signals of M wavelengths (M being an integer of two or more) respectively input from N (N being an integer of two or more) input optical transmission lines, into M×N optical signals of respective wavelengths;

an optical regeneration section for regenerating and outputting the M×N optical signals of the respective wavelengths demultiplexed by the wavelength demultiplexers, said optical regeneration section comprising: M light sources in K sets (K being one or more and less than N/2 with divisor of N) for outputting lights of mutually different wavelengths; M×K optical splitters for respectively N/K dividing the lights from the light sources and outputting N lights for each wavelength, M×N opto-electrical converters for converting the M×N optical signals of the respective wavelengths into electrical signals, and M×N external modulators for corresponding the electrical signals for the converted M×N optical signals of respective wavelengths, with the N lights for each of the respective wavelengths divided by the M×N optical splitters, and modulating the corresponding wavelength lights by the electrical signals and then outputting; and an (M×N) input N output cross-connect section for rearranging the routing for the M×N regenerated optical signals and outputting to any of N output optical transmission lines.

According to a second aspect of the present invention there is provided an optical cross-connect system comprising:

wavelength. demultiplexers for demultiplexing wavelength division multiplexed signals of M wavelengths (M being an integer of two or more) respectively input from N (N being an integer of two or more) input optical transmission lines, into M×N optical signals of respective wavelengths, a wavelength replacing section for wavelength replacing and regenerating and then outputting the M×N optical signals of the respective wavelengths demultiplexed by the wavelength demultiplexers, said wavelength replacing section comprising: M light sources in K sets (K being the divisor of N) for outputting lights of mutually different wavelengths; M×K optical splitters for respectively N/K dividing the lights from the light sources and outputting N lights for each wavelength; N optical space switches into which are respectively input 1 set of M wavelength lights from N sets of M wavelength lights output from the M×K optical splitters, for consecutively replacing the input lights and respectively outputting M wavelength lights; M×N opto-electrical converters for converting the M×N optical signals of the respective wavelengths into electrical signals; and M×N external modulators for corresponding the electrical signals for the converted M×N optical signals of respective wavelengths, with the N lights for each of the respective wavelengths output from the N optical space switches, and modulating the corresponding wavelength lights by the electrical signals and then outputting; and an (M×N) input N output cross-connect section for rearranging the routing for the M×N optical signals output from the wavelength replacing section, and outputting to any of N output optical transmission lines.

Moreover with the second aspect, the optical space switch may comprise a plurality of optical gate switches, and transfer of cross-talk components may be prevented by having the optical gate switch passing optical signals ON, and the optical gate switches not passing optical signals OFF.

According to a third aspect of the present invention there is provided an optical cross-connect system comprising:

N wavelength demultiplexers for demultiplexing wavelength division multiplexed signals of M wavelengths (M being an integer of two or more) respectively input from N (N being an integer of two or more) input optical transmission lines, into M×N optical signals of respective wavelengths.

a wavelength conversion section for wavelength converting and then outputting the M×N optical signals of the respective wavelengths demultiplexed by the N wavelength demultiplexers, said wavelength conversion section comprising:

either one of;

N light source sections corresponding to the N input optical transmission lines and incorporating:

M light sources for outputting lights of mutually different fixed wavelengths;

M input M output optical star-couplers for wavelength multiplexing and M dividing the optical outputs from the light sources, and M tunable wavelength filters into which are input the wavelength multiplexed lights divided by the M input M output optical star-couplers, which pass lights of predetermined wavelength only and which shut-off lights of other wavelengths, and N/K (where K is the divisor of N) light source sections corresponding to the N input optical transmission lines and incorporating:

M light sources for outputting lights of mutually different fixed wavelengths;

M input K output optical star-couplers for wavelength multiplexing and K dividing the optical outputs from the light sources.

1 input M output optical splitters for respectively M dividing the wavelength multiplexed lights divided by the M input K output optical star-couplers, and M×K tunable wavelength filters into which are input the wavelength multiplexed lights divided by the 1 input M output optical splitters, which pass lights of predetermined wavelength only and which shut-off lights of other wavelengths.

M×N opto-electric converters for converting the optical signals of respective wavelengths demultiplexed by the wavelength demultiplexers, into electrical signals, and M×N external modulators for corresponding the M×N electrical signals output from the respective opto-electric converters with the M×N lights of respective wavelengths output from the respective tunable wavelength filters of the light source sections, and modulating the corresponding wavelength lights by the electrical signals and then outputting, and an (M×N) input N output cross-connect section for rearranging the routing for the M×N wavelength converted optical signals, and outputting to any of N output optical transmission lines.

According to a fourth aspect of the present invention there is provided an optical cross-connect system comprising:

N wavelength demultiplexers for demultiplexing wavelength division multiplexed signals of M wavelengths (M being an integer of two or more) respectively input from N (N being an integer of two or more) input optical transmission lines, into M×N optical signals of respective wavelengths, a wavelength conversion section for wavelength converting and then outputting the M×N optical signals of the respective wavelengths demultiplexed by the N wavelength demultiplexers, said wavelength conversion section comprising:

either one of;

N light source sections corresponding to the N input optical transmission lines and incorporating:

M light sources for outputting lights of mutually different fixed wavelengths;

M sets of 1 input M output optical splitters for respectively M dividing the optical outputs from the light sources, and M sets of M input 1 output optical switches into which are input the lights of respective wavelengths divided by the respective 1 input M output optical splitters, which select and output lights of one of the wavelengths, and N/K (where K is the divisor of N) light source sections corresponding to the N input optical transmission lines and incorporating:

M light sources for outputting lights of mutually different fixed wavelengths;

M sets of 1 input K output optical splitters for respectively K dividing the optical outputs from the light sources, M×K sets of 1 input K output optical splitters for respectively M dividing the lights divided by the respective 1 input K output optical splitters, and M×K sets of M input 1 output optical switches into which are input the lights of respective wavelengths divided by the respective 1 input M output optical splitters, which select and output lights of one of the wavelengths.

M×N opto-electric converters for converting the optical signals of respective wavelengths demultiplexed by the wavelength demultiplexers, into electrical signals, and M×N external modulators for corresponding the M×N electrical signals output from the respective opto-electric converters with the M×N lights of respective wavelengths output from the respective M input 1 output optical switches of the respective light source sections, and modulating the corresponding wavelength lights by the electrical signals and then outputting, and an (M×N) input N output cross-connect section for rearranging the routing for the M×N wavelength converted optical signals, and outputting to any of N output optical transmission lines.

Moreover with the fourth aspect, optical gate switches may be provided at the output stages of the M input 1 output optical switches, and transfer of cross-talk components may be prevented by having the optical gate switch for the input line carrying the optical signals ON, and the optical gate switches for the other output lines OFF.

With the above construction, economy can be achieved by commonalizing the light sources. Moreover, by reducing the light sources required for wavelength monitoring and stability control, then a stabilized cross-connect system can be constructed.

By using fixed wavelength light sources in the wavelength conversion section, then difficulties in constructing the light sources, and the consequent drop in yield, can be avoided.

Moreover, by having the construction wherein optical switches are combined with the optical splitters, then cross talk components can be suppressed.

With the optical cross-connect system, there are cases where optical amplification is required to compensate for losses. However adding an optical amplifier results in the accumulation of ASE (amplified spontaneous emissions) which affects the SNR (signal-to-noise ratio). Hence, if an optical amplifier is added, it is necessary to provide some means of eliminating the ASE. With the present invention however, by providing the optical gate switches in the optical switches, then as well as lower cross-talk, the amplified spontaneous emissions of CW lights of other than the desired wavelength can be prevented.

BRIEF DESCRIPTION OF THE DRAWINGS

FIG. 9 is a block diagram showing a fifth embodiment of an optical cross-connect system according to the present invention;

DESCRIPTION OF THE PREFERRED EMBODIMENTS

Figure 1:
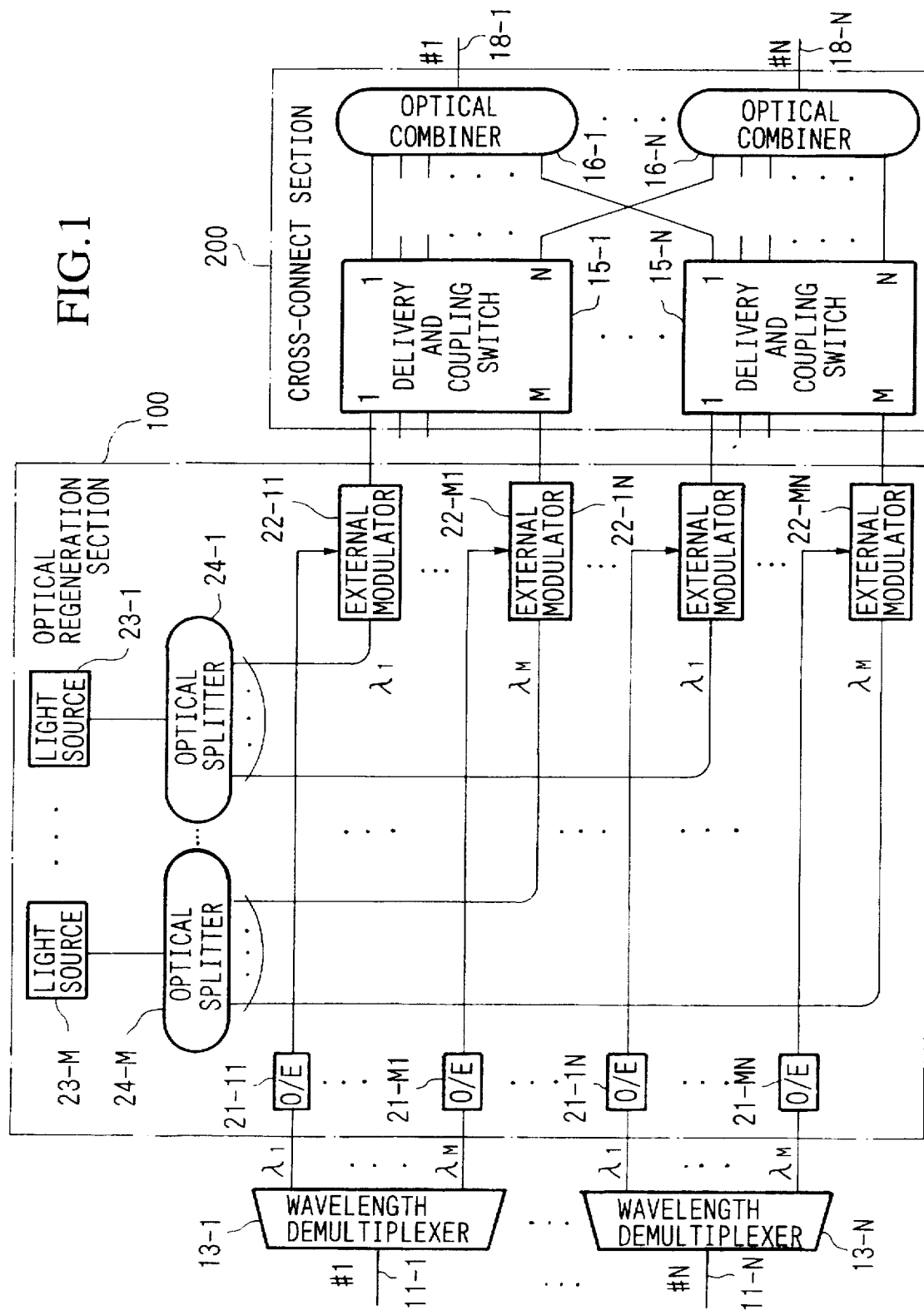
FIG. 1 is a block diagram showing a first embodiment of an optical cross-connect system according to the present invention.

FIG. 1 shows a first embodiment of an optical cross-connect system according to the present invention used in a WP system. This embodiment is for cross-connecting M×N optical paths and includes: an optical regeneration section 100 having M light sources for respectively outputting CW lights of wavelengths $\lambda_1 \sim \lambda_M$, and M optical splitters for respectively N dividing output lights from the M light sources; and a cross-connect section 200 for cross-connecting the output from the optical regeneration section 100 and outputting to N optical fibers. The present invention is characterized in that one set of the M light sources corresponding to respective wavelengths is made common with the N optical fibers. In FIG. 1, wavelength division multiplexed signals of M wavelengths input from optical fibers 11-$j$ ($j$=1,2, . . . , N) are demultiplexed into optical signals of respective wavelengths of $\lambda_1 \sim \lambda_M$ by wavelength demultiplexers 13-$j$. The optical signals of wavelengths $\lambda_i$ ($i$=1, 2, . . . , M) are then converted into electrical signals by opto-electric conversion circuits (O/E) 21-$ij$, and then input to external modulators 22-$ij$. On the other hand, a CW light of wavelength $\lambda_i$ output from the light source 23-$i$ is N divided by the optical splitter 24-$i$ and then input to the external modulator 22-$ij$. The external modulator 22-$ij$ modulates the CW light of wavelength $\lambda_i$ using an electrical signal corresponding to the optical signal of wavelength $\lambda_i$, and outputs this as a regenerated optical signal. The regenerated optical signal of wavelength $\lambda_i$ is then cross-connected to the optical fiber 18-$j$ via an M input N output delivery and coupling switch 15-$j$, and an N input 1 output optical combiner 16-$j$. For example when routing the optical signal (optical path) of wavelength $\lambda_i$ input from the optical fiber 11-$l$, to the optical fiber 18-N, the optical signal of wavelengths $\lambda_i$ is switched by the M input N output delivery and coupling switch 15-$l$ and sent on to the optical fiber 18-N via the N input 1 output optical combiner 16-N. The (M×N) input N output cross-connect section is thus made up from N sets of M input N output delivery and coupling switches 15 and N sets of N input 1 output optical combiners 16, thus enabling cross-connection of M×N optical paths to N routes.

The optical signal of M wavelengths input to one of the M input N output delivery and coupling switches 15, is delivered to any of the output ports of the N routes. At this time, optical signals of two or more wavelengths are output to one output port. However, when optical combining with the N input 1 output optical combiners 16, a prescribed wavelength allocation is carried out so that optical signals of the same wavelength do not collide.

For the external modulators 22, semiconductor absorption intensity modulators or Mach-Zehnder intensity modulators may be used.

With this embodiment, a single light source is provided for each respective wavelength. However a plurality of light sources may instead be provided for each respective wavelength. In this case, when the light sources for the respective wavelengths are provided as K sets, then M×N laser lights can be obtained using M×K optical splitters for N/K division of the output lights from the respective light sources. For example, when two light sources are provided for each respective wavelength, then an optical splitter for N/2 divisions can be used instead of an optical splitter for N divisions. Hence the losses occurring in the optical splitter can be reduced, enabling a prescribed optical power to be maintained.

Figure 2:
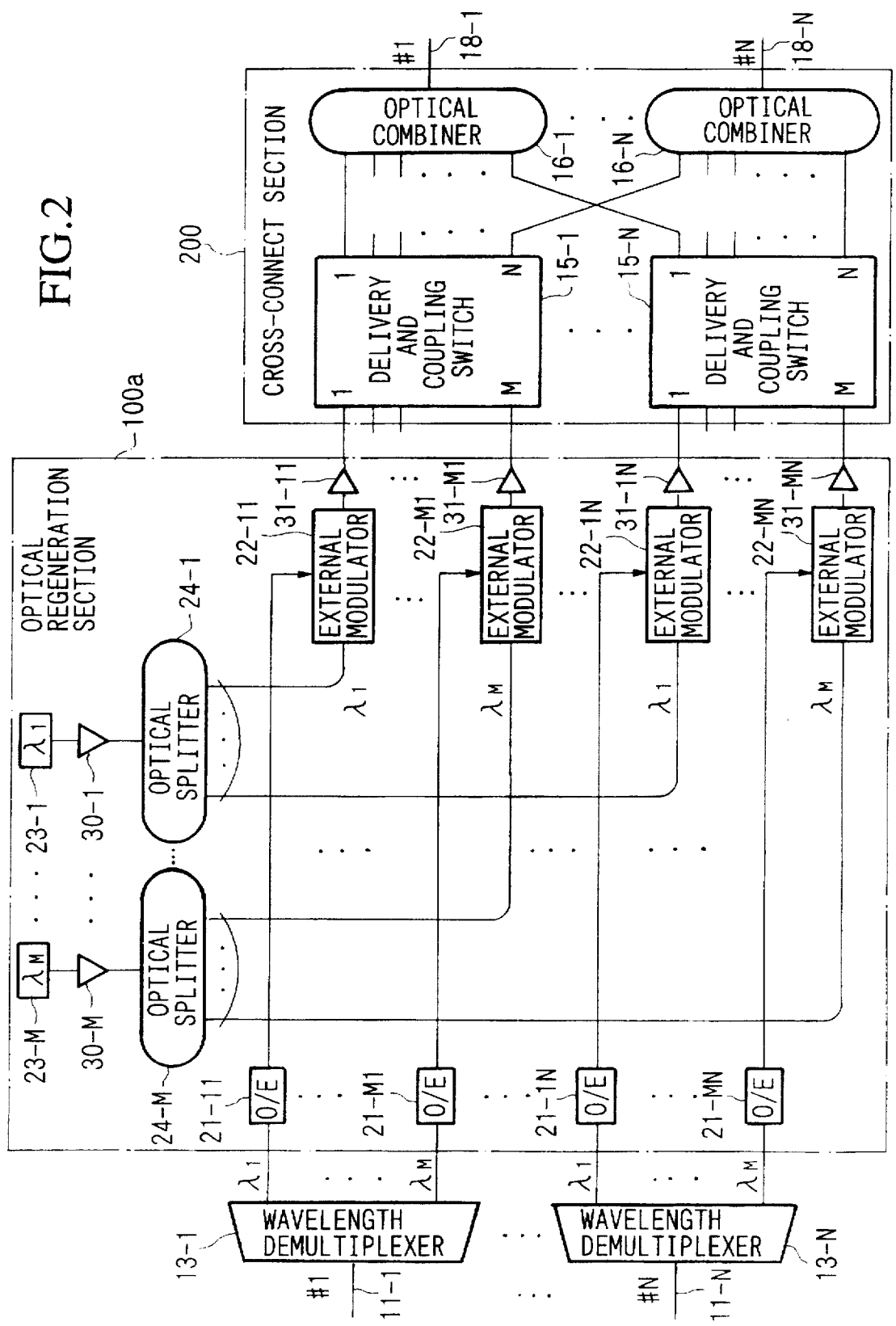
FIG. 2 is a block diagram showing a second embodiment of an optical cross-connect system according to the present invention.

FIG. 2 is a block diagram showing a second embodiment of an optical cross-connect system according to the present invention. The second embodiment is characterized in that, compared to the first embodiment, optical amplifiers for compensating for the losses occurring in the optical splitters 24-$i$, are arranged in the optical regeneration section 100$a$. The losses occurring in the optical splitters 24-$i$ can be compensated for by arranging the optical amplifier 30-$i$ prior to the optical splitters 24-$i$ as shown in FIG. 2. Moreover, since losses also occur in the external modulators 22-$ij$, then these losses can be compensated for by arranging optical amplifiers 31-$ij$ prior or subsequent thereto (shown subsequent thereto in FIG. 2) to thereby maintain a prescribed SNR. For the optical amplifiers used here, erbium-doped fiber amplifiers, semiconductor laser optical amplifiers, Raman amplifiers, Brillouin amplifiers or the like may be used.

With the semiconductor laser optical amplifier, since the gain can be modulated at high speed, then a weak modulation component (pilot tone signal) for identifying the wavelength and input port, can be superimposed. For example, a pilot tone signal for wavelength identification is superimposed in the optical amplifier 30-$i$ arranged prior to the optical splitter 24-$i$, and a pilot tone signal for input port identification is superimposed in the optical amplifier 31-$ij$ arranged subsequent to the external modulator 22-$ij$. For these pilot tone signals, a characteristic frequency is prescribed for each wavelength and for each input port. Hence by monitoring the pilot tone signals at intermediate nodes in the VVP optical path cross-connect system without terminating the optical signals, and detecting the levels of the pilot tone signals for the respective frequencies, then the optical paths of the respective wavelengths, and the cross-connect conditions can be monitored.

At the intermediate nodes, the input optical signals are divided, O/E converted, and the pilot tone signals only are taken out using a synchronized detection circuit or the like, so that monitoring can be carried out. This synchronized detection circuit is set to a desired frequency.

By using means such as described above to monitor the optical signals of the respective output lines of the delivery and coupling switches 15-$j$, or the output lines of the optical combiners 16-$j$, then it can be determined whether or not the delivery and coupling switches inside the system itself are properly set.

Figure 3:
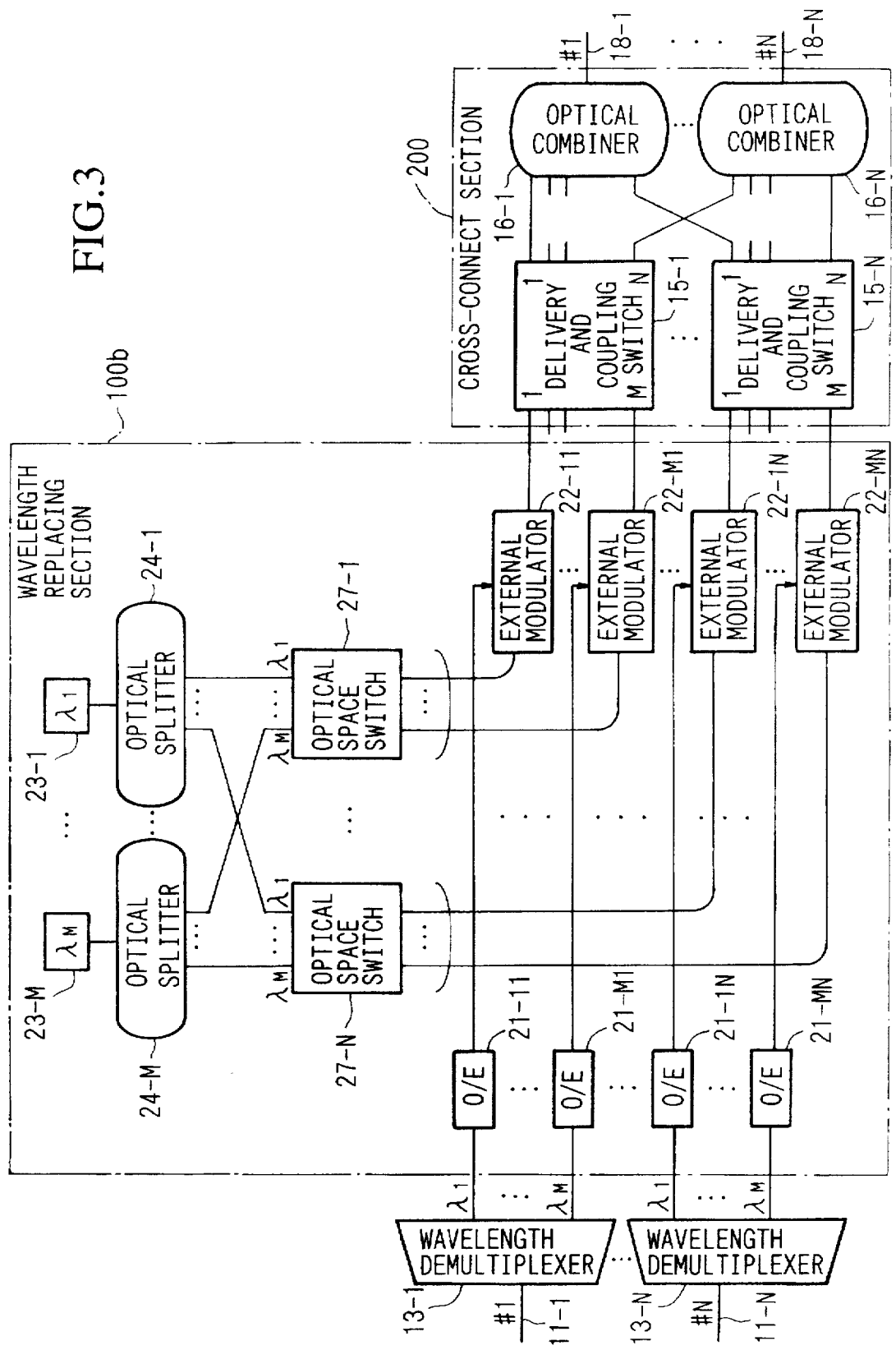
FIG. 3 is a block diagram showing a third embodiment of an optical cross-connect system according to the present invention.

A third embodiment of an optical cross-connect system according to the present invention will now be described with reference to FIG. 3. With the first and second embodiments, the corresponding relationships between the wavelengths and the respective light paths were fixed so that for example, a CW light of wavelength $\lambda_l$ was input to the external modulator 22-$ll$, and a CW light of wavelength $\lambda_M$ was input to the external modulator 22-M1. With the arrangement as shown in FIG. 3 however, a pseudo-tunable wavelength light source can be constructed by inserting N optical space switches 27-$j$ between optical splitter 24-$i$ and external modulator 22-$ij$ inside a wavelength replacing section 100$b$ corresponding to the regeneration sections 100 and 100$a$, to thereby switch the wavelength of the CW light input to the respective external modulator 22-$ij$. With the optical cross-connect systems of the first and second embodiments, the wavelengths of the optical signals output from the regeneration sections 100 and 100$a$ were pre-fixed for the M input ports of the respective delivery and coupling switches 15-$i$. With the third embodiment of the optical cross-connect system shown in FIG. 3 however, wavelengths $\lambda_1$~$\lambda_M$ can be optionally replaced for each of the respective delivery and coupling switches 15-$i$. With the optical cross-connect system of the third embodiment also, as with the WP optical cross-connect systems of the first and second embodiments, plural optical signals of the same wavelength cannot be input to the same delivery and coupling switches 15-$i$ at the same time. Concerning this point, the third embodiment differs from the VWP optical cross-connect system.

With the third embodiment, as with the second embodiment described with reference to FIG. 2, optical amplifiers can be added to inside the wavelength replacing section 100$b$. Moreover, with the third embodiment, as with the second embodiment, in the case wherein semiconductor optical amplifiers are used for the optical amplifiers, monitoring of the lights can be carried out using a pilot tone signal. At this time, in the wavelength replacing section 100$b$, by selecting with the optical space switch 27, a desired wavelength from the CW light superimposed with the wavelength identifying pilot tone, and then monitoring the pilot tone signal, it is possible to monitor whether or not the desired wavelength has been selected.

Figure 4:
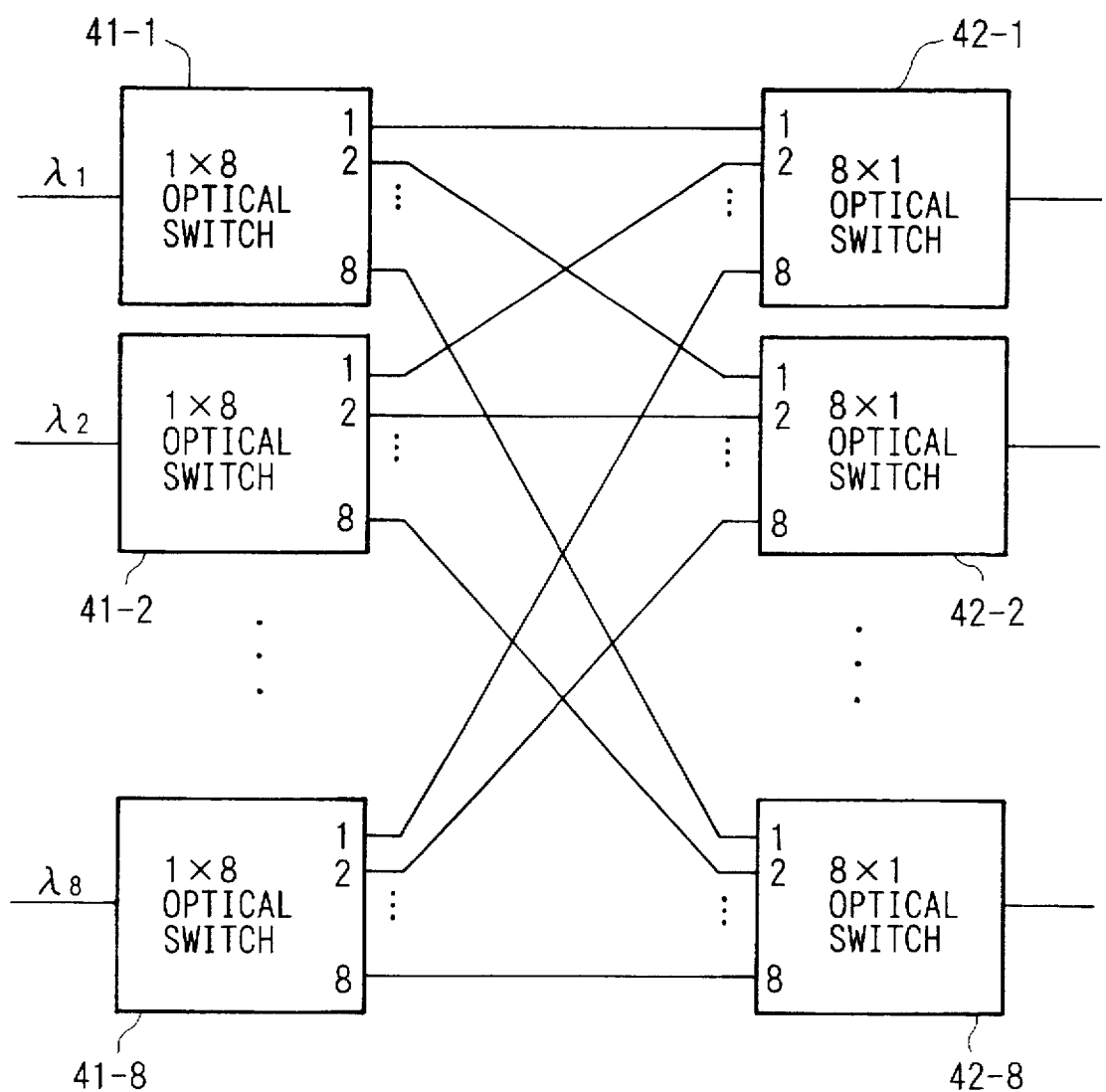
FIG. 4 is a block diagram showing a structural example of an optical space switch 27 of M=8 scale.

FIG. 4 is a block diagram showing a structural example of the optical space switch 27 shown in FIG. 3, this case being for when the number of multiplexed wavelengths M is 8. In FIG. 4, input side 1 input 8 output optical switches 41-1~41-8, and output side 8 input 1 output optical switches 42-1~42-8 are connected to each other. CW lights of respective wavelengths $\lambda_1$~$\lambda_8$ are input to the input side 1 input 8 output optical switches 41-1~41-8, and the switches are switched so that one of the external modulators 22 to which the CW lights are delivered is selected.. The wavelengths for sending to the respective external modulators 22 are selected by the output side 8 input 1 output optical switches 41-1~42-8. With this construction, by having the switching of the spatial switches (1 input 8 output optical switches 41-1~41-8) and the wavelength selection switches (8 input 1 output optical switches 42-1~42-8) carried out independently, then at the time of switching it is possible to prevent a plurality of optical signals of differing wavelengths from becoming temporarily mixed in a single external modulator 22.

Incidentally, in an optical cross-connect system having an optical signal regeneration section as shown in FIG. 1, there are N signals of wavelength $\lambda_M$. Here, to ensure that wavelength collision does not occur in the output optical fiber 18, then wavelength allocation is carried out beforehand. However if the ON/OFF ratio in the delivery and coupling switches 15 is not infinitely large, then (N–1) undesired leak components of the same wavelength will be switched to the output optical fiber 18 from the cross-connect section 200. Assuming that the power penalty is suppressed to within 0.2 dB, then it is necessary to keep the total of these same wavelength leak components to less than −28 dB. For example, assuming that the number of input/ output fibers is N=16 and the number of multiplexed wavelengths is M=8, then (N−1)=15 and hence the delivery and coupling switch ON/OFF ratio must be greater than 40 dB (28+10 $\log_{10}15$ (dB)).

In the cross-connect system of FIG. 3, since a CW light of the desired wavelength (for example $\lambda_1$) is selected by the optical space switch 27, then CW lights of other wavelengths (for example other than $\lambda_1$) leak into the output from the optical space switch 27. This leak component passes through the cross-connect section 200 together with the optical signals (wavelength $\lambda_1$) and is output to the output fiber 18. Hence in the wavelength replacing section 100b also, an ON/OFF ratio of greater than 40 dB is required. Consequently, the optical space switch 27 also, requires an ON/OFF ratio greater than 40 dB.

Accordingly, in the case where optical switches are used, one criterion is to realize an optical cross-connect system wherein an optical switch ON/OFF ratio of greater than 40 dB is possible. With the wavelength conversion section 300 in the subsequent embodiments also, the same requirements apply for the optical switch ON/OFF ratio.

Therefore with the 1×M optical switch 41 or the M×1 optical switch 42 shown in FIG. 4, then under the above-mentioned conditions for example, an ON/OFF ratio greater than 40 dB is required. As a switch for obtaining this level difference, there is currently a switch involving PLC (Planar Lightwave Circuit) technology which uses the thermo-optic effect (refer to: Masayuki OKUNO et. al., "8×8 Optical Matrix Switch Using Silica-Based Planar Lightwave Circuits", IEICE TRANS. ELECTRON., VOL. E76-C, NO. 7 JULY 1993; and R. Nagase et. al., "Silica-Based 8×8 Optical Matrix Switch Module with Hybrid Integrated Driving Circuits," ECOC '93 Mopl. 2 Sep. 12–16, 1993), a solid state optical switch similarly using the thermo-optic effect (refer to: "Active Components for Optical Networks Using Polymer Technology", IOOC '95 (Integrated Optics and Optical Fibre Communication), June 26–30, 1995, and "Solid State Optical Switches Newsletter," Akzo Nobel Corp. Sep. 1995), or a mechanical switch. However, with the M×1 optical switch or the 1×M optical switch, since a large number are required in the cross-connect system in order to correspond to the respective optical signals, then from the view point of miniaturization with the state-of-the-art technology, switches using the thermo-optic effect are best. However with M×1 or 1×M switches using the thermo-optic effect, since the cross-talk characteristics are rather inferior compared to the mechanical switch device, an improvement in these characteristics is desirable.

Figure 5:
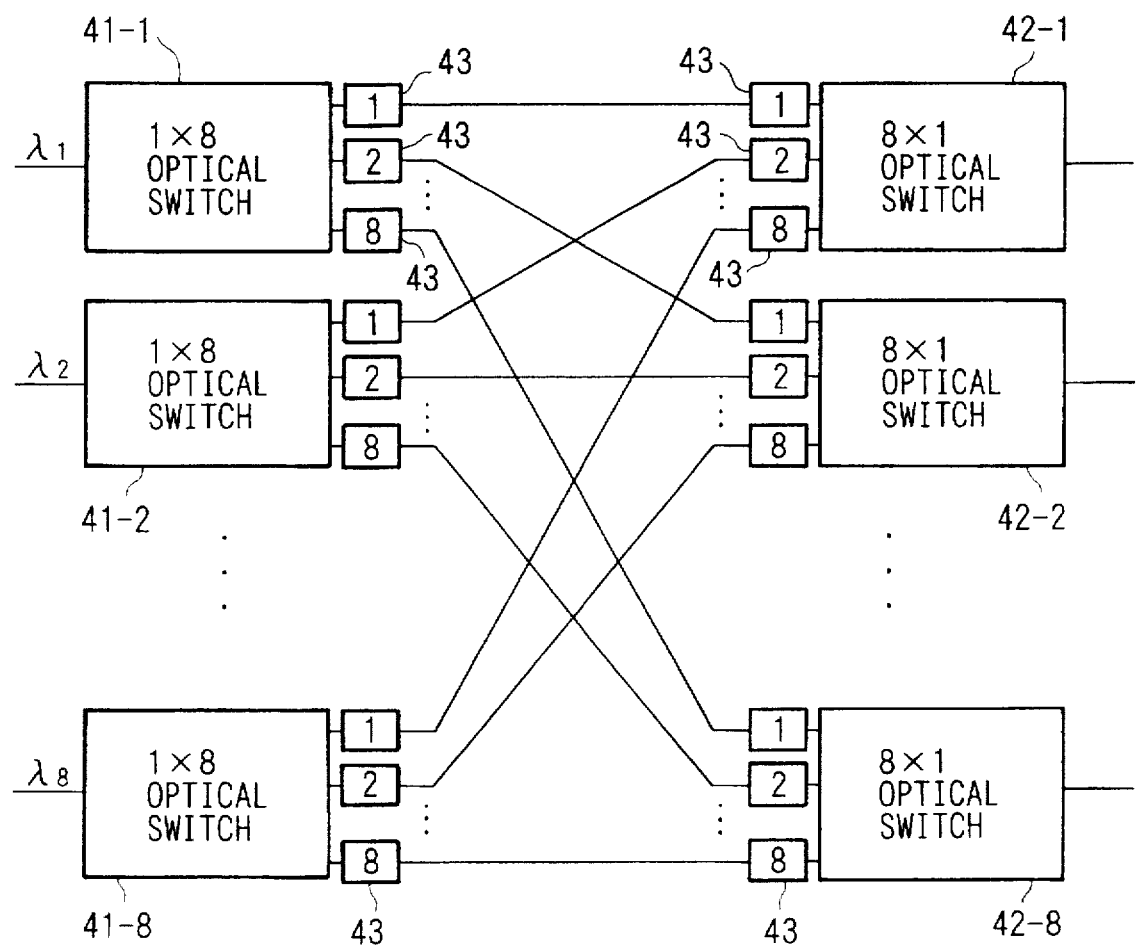
FIG. 5 is a block diagram showing a structural example of the optical space switch 27 fitted with gate switches.

The construction of the optical space switch 27 according to the present invention shown in FIG. 5 improves the cross-talk characteristics by further adding optical gate switches to the construction of FIG. 4. With the optical space switch 27 shown in FIG. 5, respective optical gates 43 are provided at the respective output ports of the 1×8 optical switches 41-1–41-8 and the respective input ports of the 8×1 optical switches 42-1–42-8. Control of the respective optical gate switches 43 so that only one optical signal passes for each 1×8 optical switch 41 or each 8×1 optical switch 42, is achieved by having only the optical gate switch 43 of the desired output line ON, and the other optical gate switches 43 OFF. In this way, cross-talk characteristics can be improved compared to the case with no optical gate switches 43. Moreover, when the optical gate switch 43 is one which uses the thermo-optic effect, then the output level of the optical signals can be adjusted by changing the electrical drive power for the optical gate switch, and hence level variations due to individual differences in the respective optical components can be absorbed. With the construction shown in FIG. 5, optical gate switches 43 are provided for both the respective output ports of the 1×8 optical switch 41, and the respective input ports of the 8×1 optical switch 42. However the optical gate switches may be provided for only one or other of the switches. If the optional output level adjustment function of the optical gate switches is considered, then the overall ON/OFF ratio of the optical space switch 27 must be a value greater than 40 (dB) plus the level adjustment component. For example, if the level adjustment component is 3 dB, then the ON/OFF ratio must be greater than 43 dB.

For the 8 input 8 output optical space switch 27 shown in FIG. 4 or in FIG. 5, a possible construction, although disadvantageous from the point of losses or cross-talk, is one wherein the input side 1 input 8 output optical switches 41-1–41-8 are replaced by 1 input 8 output optical splitters, or a construction wherein the output side 8 input 1 output optical switches 42-1–42-8 are replaced by 8 input 1 output optical combiners. Moreover, for the 8 input 8 output optical space switch 27, a crossbar-type 8 input 8 output optical switch (refer to: Masayuki OKUNO et. al., "8×8 Optical Matrix Switch Using Silica-Based Planar Lightwave Circuits", IEICE TRANS. ELECTRON., VOL. E76-C, NO. 7 JULY 1993) can be used. By using such an optical space switch, then in cases where it is difficult to maintain a prescribed tunable wavelength range in a tunable wavelength light source alone, artificial functioning as a tunable wavelength light source is possible by preparing fixed wavelength light sources in a plurality of types and switching the outputs thereof. In particular, the present construction is effective in networks where it is desirable to arrange the wavelengths at unequal spacing. An example of such a network, is a transfer system wherein it is assumed that the wavelength range of the optical signal overlaps with the zero dispersion wavelength of the optical fiber used as the optical transmission line, and the wave form of the optical signal might deteriorate due to the generation of four wavelength mixing.

With the conventionally used DBR-LD, in general the wavelength changes discontinuously, and since the discontinuous space becomes a frequency space determined for example by the laser oscillator length, then this cannot be applied to networks wherein the wavelength must be positioned in an unequal space. On the other hand, with the construction of the present invention, since the respective light sources are independent, then the wavelength for an unequal space can be easily set. Furthermore, with the construction of the present invention, since there is no need to change the wavelength in analog fashion, then stabilized wavelength characteristics are obtained.

With the optical cross-connect system of the present invention, by sharing the light sources corresponding to the respective wavelengths, then the construction for monitoring of the respective wavelengths and for wavelength stabilization control can be compacted. As wavelength monitoring circuits for monitoring the respective wavelengths of the wavelength multiplexed lights, there is for example a device wherein an arrayed waveguide grating or a scanning Fabry-Perot interferometer is used. The wavelength monitoring circuit using the arrayed waveguide grating, effects wavelength discrimination which is independent of changes in incident light strength by taking the level ratios of the output lights from the adjacent ports using the periodic bandpass transmission characteristic of the arrayed waveguide grating. Moreover, the wavelength monitoring circuits using the scanning Fabry-Perot interferometer, effects wavelength discrimination by periodically scanning the center transmission wavelengths of the scanning Fabry-Perot interferometer, and converting the wavelength error to a time region (refer to: Takashi MIZUOCHI et. al., "Frequency Stabilized 622-Mb/s 16-Channel Optical FDM System and its Performance in 1.3/1.55-μm Zero-Dispersion Fiber Transmission," Journal of Lightwave Technology, Vol. 13, No. 10, October 1995).

Figure 6:
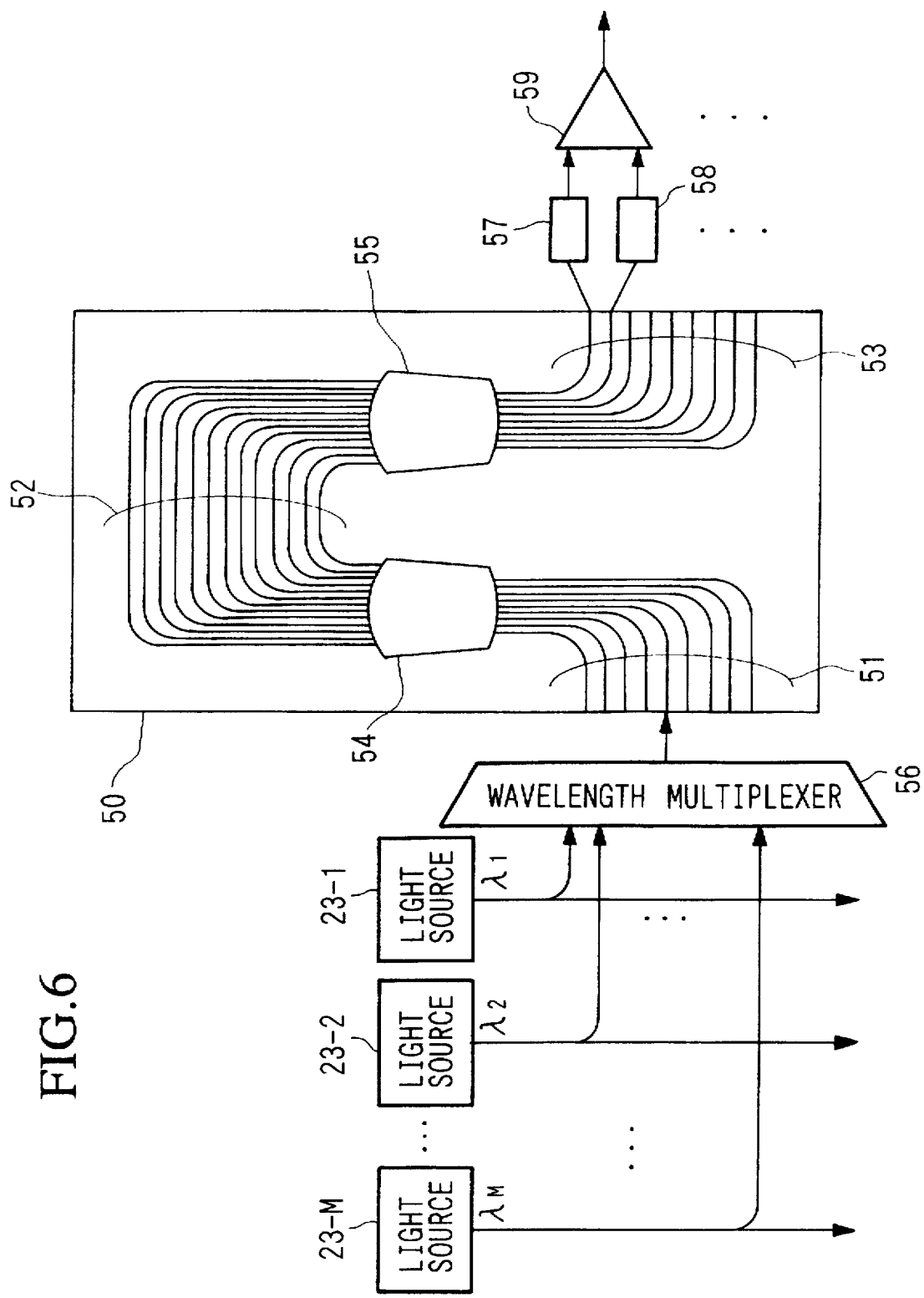
FIG. 6 is a diagram showing an example of a wavelength monitoring circuit which uses an arrayed waveguide grating.
Figure 7:
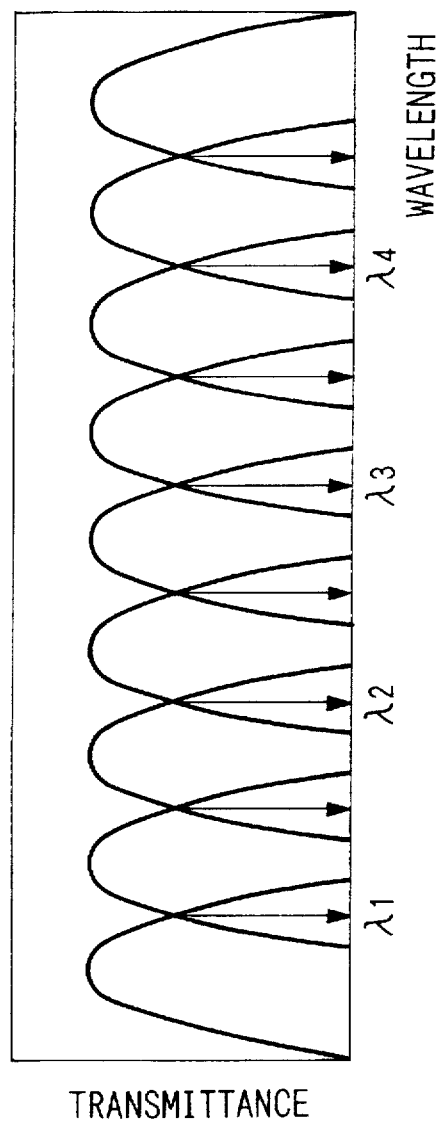
FIG. 7 is a diagram showing the transmission characteristics of the respective ports of the output waveguide 53 of FIG. 6.

FIG. 6 shows an example of a wavelength monitoring circuit which uses the arrayed waveguide grating. In FIG. 6, the arrayed waveguide grating has a substrate 50 on which is formed N input waveguides 51, a waveguide array 52 made up of M waveguides successively longer by predetermined waveguide length differences, N output waveguides 53, an input side concave slab waveguide 54 for connecting the input waveguides 51 and the waveguide array 52, and an output side concave slab waveguide 55 for connecting the waveguide array 52 and the output waveguides 53. CW lights of wavelength $\lambda_1 \sim \lambda_M$ output from light sources 23-1 ~23-M of respective wavelengths are wavelength multiplexed by a wavelength multiplexer 56 and input to one of the input waveguides 51. The transmission characteristics of the respective ports of the output waveguides 53 at this time become as shown in FIG. 7. FIG. 7 shows how the crossover wavelengths of the transmission characteristics of the adjacent ports and the respective light source wavelengths correspond.

Connected to the adjacent ports of the output waveguides 53 are respective optical detectors 57 and 58 which are connected to a logarithmic amplifier 59 which takes their output ratios. The output from the logarithmic amplifier 59 becomes zero at the crossover wavelength. That is to say, the relative wavelength error of the respective light source wavelengths and the crossover wavelengths can be detected according to the polarity and level of the error signal output from the logarithmic amplifier 59. This wavelength error signal can thus be used to effect wavelength stabilization control of the light source.

Figure 8:
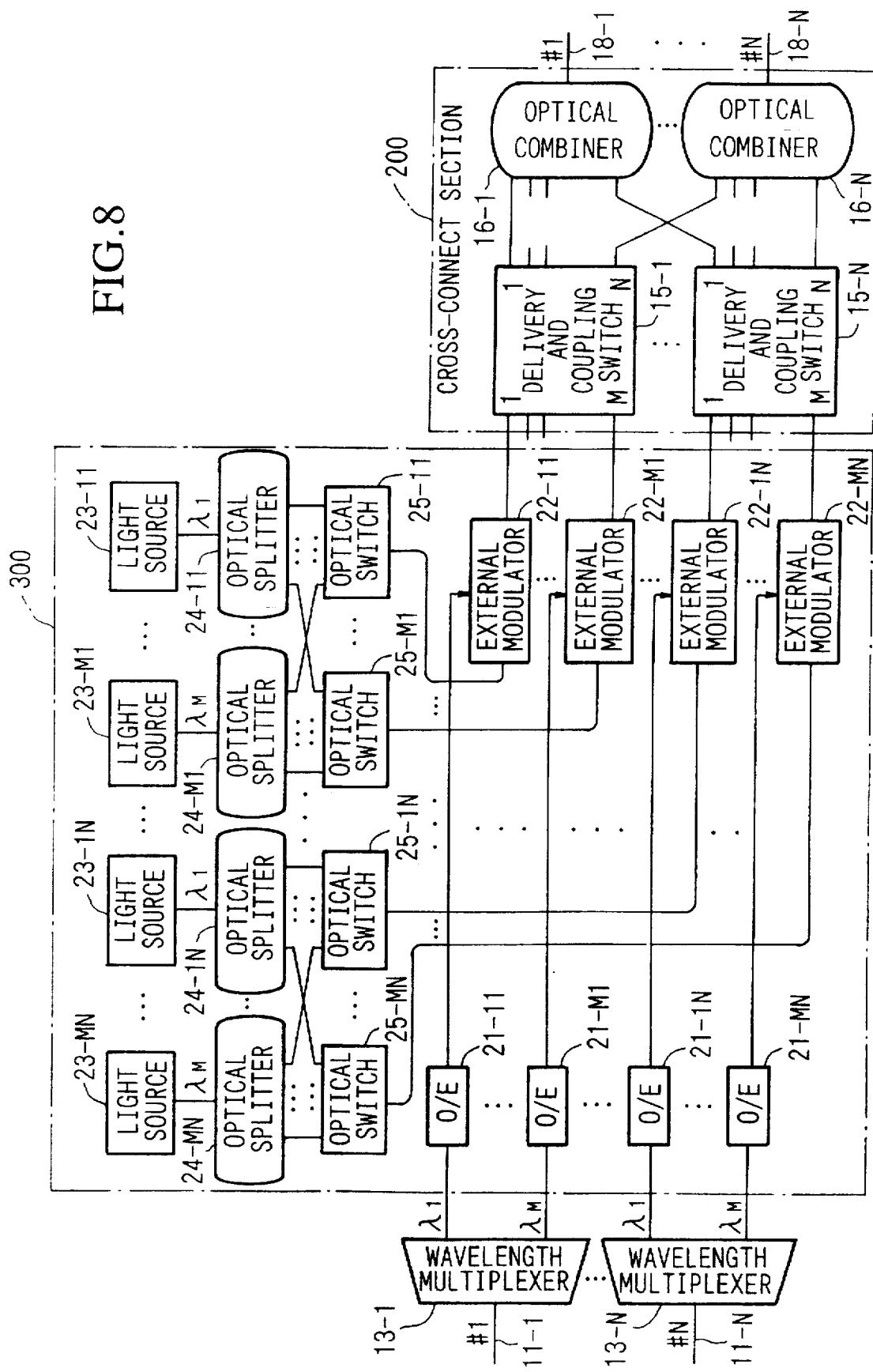
FIG. 8 is a block diagram showing a fourth embodiment of an optical cross-connect system according to the present invention.

FIG. 8 is a block diagram showing a fourth embodiment of the present invention, being a VWP optical cross-connect system. The optical cross-connect system shown in FIG. 8 is made up of a cross-connect section 200 similar to that shown in FIG. 1, and a wavelength conversion section 300 with a wavelength conversion function further added to the function of the regeneration section 100 shown in FIG. 1. This embodiment also, as with the embodiment of FIG. 1 is characterized in that the light sources are shared by using light sources and optical splitters in combination. In FIG. 8, wavelength division multiplexed signals of M wavelengths input from input optical fibers 11-$j$ ($j=1,2, \ldots, N$) are demultiplexed into the respective wavelength optical signals by wavelength demultiplexers 13-$j$. The optical signals of wavelengths $\lambda_i$ ($i=1,2, \ldots, M$) are then converted into electrical signals by respective opto-electric conversion circuits (O/E) 21-$ij$, and input to corresponding external modulators 22-$ij$. On the other hand, CW lights of wavelength $\lambda_1 \sim \lambda_M$ output from the light sources 23-$lj$~23-M$j$, are respectively input to the 1 input M output optical splitters 24-$lj$~24-M$j$ and M divided. The respective wavelength CW lights divided by the 1 input M output optical splitters 24-$lj$~24-M$j$ are then input to the M input 1 output optical switches 25-$lj$~25-M$j$, and respective CW lights of each wavelength are selected and input to the corresponding external modulators 22-$ij$~22-M$j$. Here the wavelength division multiplexed communication light source used in the wavelength conversion of the M optical paths input from the input optical fibers 11-$j$, is constructed by the light sources 23-$lj$~23-M$j$, the 1 input M output optical splitters 24-$lj$~24-M$j$, and the M input 1 output optical switches 25-$lj$~25-M$j$. The external modulators 22-$ij$ modulate and output the CW light of wavelength $\lambda_s$ selected by the M input 1 output optical switches 25-$ij$, using an electrical signal corresponding to the optical signals of wavelength $\lambda_i$ from the optical fiber 11-$j$. As a result, the wavelengths of optical signals are converted from wavelength $\lambda_i$ to wavelength $\lambda_s$. The wavelength converted optical signals are then cross-connected to the output optical fiber 18-$j$ via the M input N output delivery and coupling switch 15-$j$ and the N input 1 output optical combiner 16-$j$.

The M input 1 output optical switches 25 may be constructed by combining 2 input 2 output thermo-optic effect optical switches of Mach-Zehnder interferometer construction (refer to the disclosure of Japanese Pat. application, First Publication, No. Hei 8-36195 regarding the optical space switch). For the external modulators 22, semiconductor absorption type intensity modulators or Mach-Zehnder type intensity modulators may be used. In this way, with the present embodiment, M fixed wavelength light sources (one wavelength division multiplexed communication light source) may be provided for the respective input optical fibers. Hence for the overall optical cross-connect system, correspondence is possible with only M×N fixed wavelength light sources (N wavelength division multiplexed communication light sources), thus enabling realization of an economical optical cross-connect system. Moreover, by using the M input 1 output optical switches 25, then cross-talk in the overall optical cross-connect system can be reduced.

FIG. 9 shows a fifth embodiment of an optical cross-connect system of the present invention. A feature of this embodiment is that a wavelength conversion section 300$a$ is made up by adding M optical splitters to the wavelength conversion section 300 in the fourth embodiment, thus having the feature of commonalization of same wavelength light sources. More specifically, the difference from the fourth embodiment shown in FIG. 8 is that a 1 input N output optical splitter 26-$l$ is provided for N dividing the CW light of for example wavelength $\lambda_l$ output from the light source 23-$l$, to the 1 input M output optical splitters 24-$lj$. Similarly a 1 input M output optical splitter 26-M and so on is provided for N dividing the CW light of wavelength $\lambda_M$ output from the light source 23-M, to the 1 input M output optical splitters 24-M$j$. In this way, the N same wavelength light sources corresponding to the respective input optical fibers can be made into one. Hence for the overall optical cross-connect system, correspondence is possible with only M fixed wavelength light sources, and in addition an economical optical cross-connect system can be realized.

In general, M fixed wavelength light sources (one wavelength division multiplexed communication light source) may be provided for K input optical fibers. Hence for the overall optical cross-connect system, correspondence is possible with only (N/K)×M fixed wavelength light sources (N/K wavelength division multiplexed communication light sources), thus enabling realization of an economical optical cross-connect system. The construction shown in FIG. 9 is for the case where K=N.

Figure 10A:
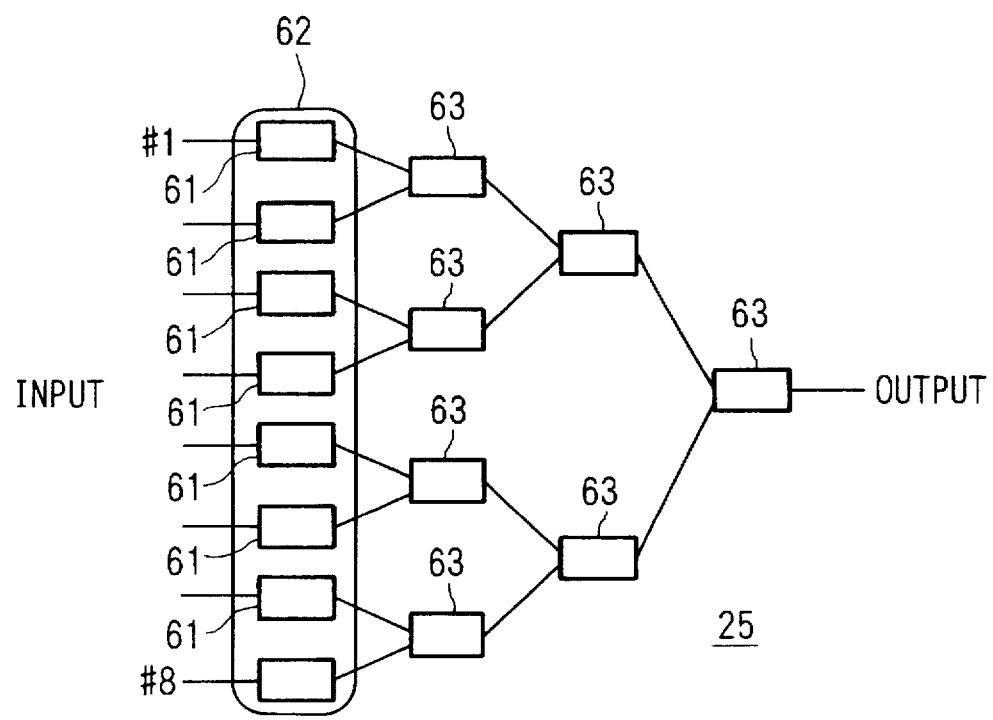
FIG. 10A and FIG. 10B are block diagrams showing respective structural examples of M input 1 output optical switches 25 of M=8 scale.
Figure 10B:
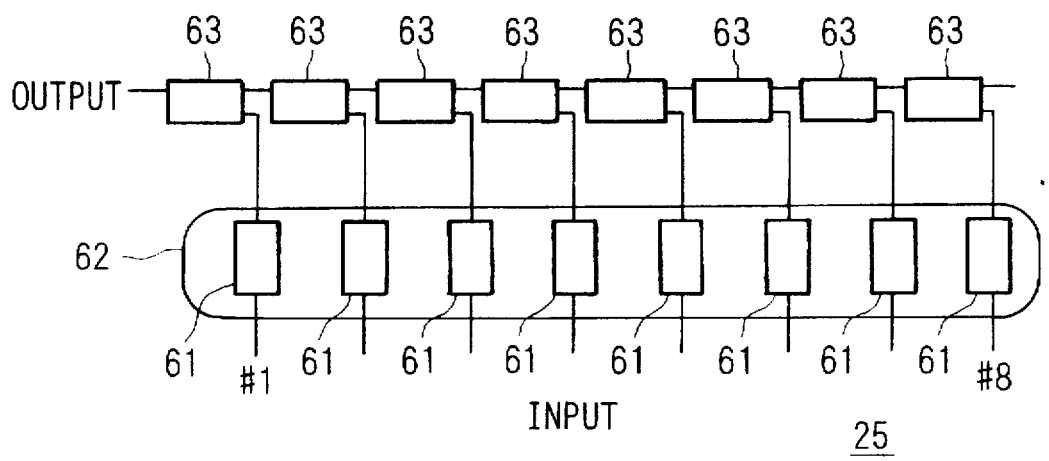

FIG. 10A and FIG. 10B are block diagrams respectively showing internal structural examples of the M input 1 output optical switches 25 shown in FIG. 8 and FIG. 9. In this case, the M input 1 output optical switches 25 shown in FIG. 10A and FIG. 10B, illustrate the case where the wavelength multiplex number M is 8. The 8 input 1 output optical switch 25 shown in FIG. 10A, is made up from an optical gate switch array 62 comprising eight optical gate switches 61, and seven 2 input 1 output optical switches 63 for finally obtaining a single output from the outputs of the eight optical gate switches 61. In this case, the 2 input 1 output optical switches 63 are arranged as shown in the figure, in three levels with; four 2 input 1 output optical switches 63 for selecting four outputs from the outputs from the eight optical gates switches 61, two 2 input 1 output optical switches 63 for selecting two outputs from the outputs from the four 2 input 1 output optical switches 63, and one 2 input 1 output optical switch 63 for obtaining a single output from the outputs from the two 2 input 1 output optical switches 63. On the other hand, the 8 input 1 output optical switch 25 shown in FIG. 10B, is made up from an optical gate switch array 62 comprising eight optical gate switches 61, and eight 2 input 1 output optical switches 63 connect in series, with one input connected to the output from the respective optical gate switches 61.

For the respective optical switches, a PLC type switch or a solid state optical switch both utilizing the thermo-optic effect, or a mechanical switch, may be used. However, as described for the case of FIG. 5, the two former switches are preferable. The gate array 62 is provided in order to improve the cross-talk characteristics as mentioned above. As mentioned, the optical gate switch 61 of the desired output line only is ON and the other optical gate switches 61 are OFF. The optical gate switches either shut-off or pass-lights irrespective of the frequency thereof. Hence if optical switches incorporating optical gate switches are used, then as well as low cross-talk, the effect of removing ASE of CW lights of other than the desired wavelength can be obtained. Moreover, with switches which utilize the thermo-optic effect, the ON output level is adjustable.

With the above construction, with the 8 input 1 output optical switch 25 shown in FIG. 10A, a desired optical output is selected by driving from zero to a maximum of three of the 2 input 1 output optical switches 63. With the 8 input 1 output optical switch 25 shown in FIG. 10B, a desired optical output is selected by continuously driving any one of the 2 input 1 output optical switches 63. Since with the 8 input 1 output optical switch 25 shown in FIG. 10A, the number of levels of the optical switches passing the optical signals is always constant, then the losses can be kept uniform. On the other hand, with the 8 input 1 output optical switch shown in FIG. 10B, since there is always only one optical switch being driven, then the power for driving the switches is always constant, and from an optical cross-connect system perspective, is thus less than for the FIG. 10A arrangement. Adjustment for variations in the losses occurring in the respective optical switches can be carried out as described above by adjusting the drive power for the optical gate switches 61.

Figure 11:
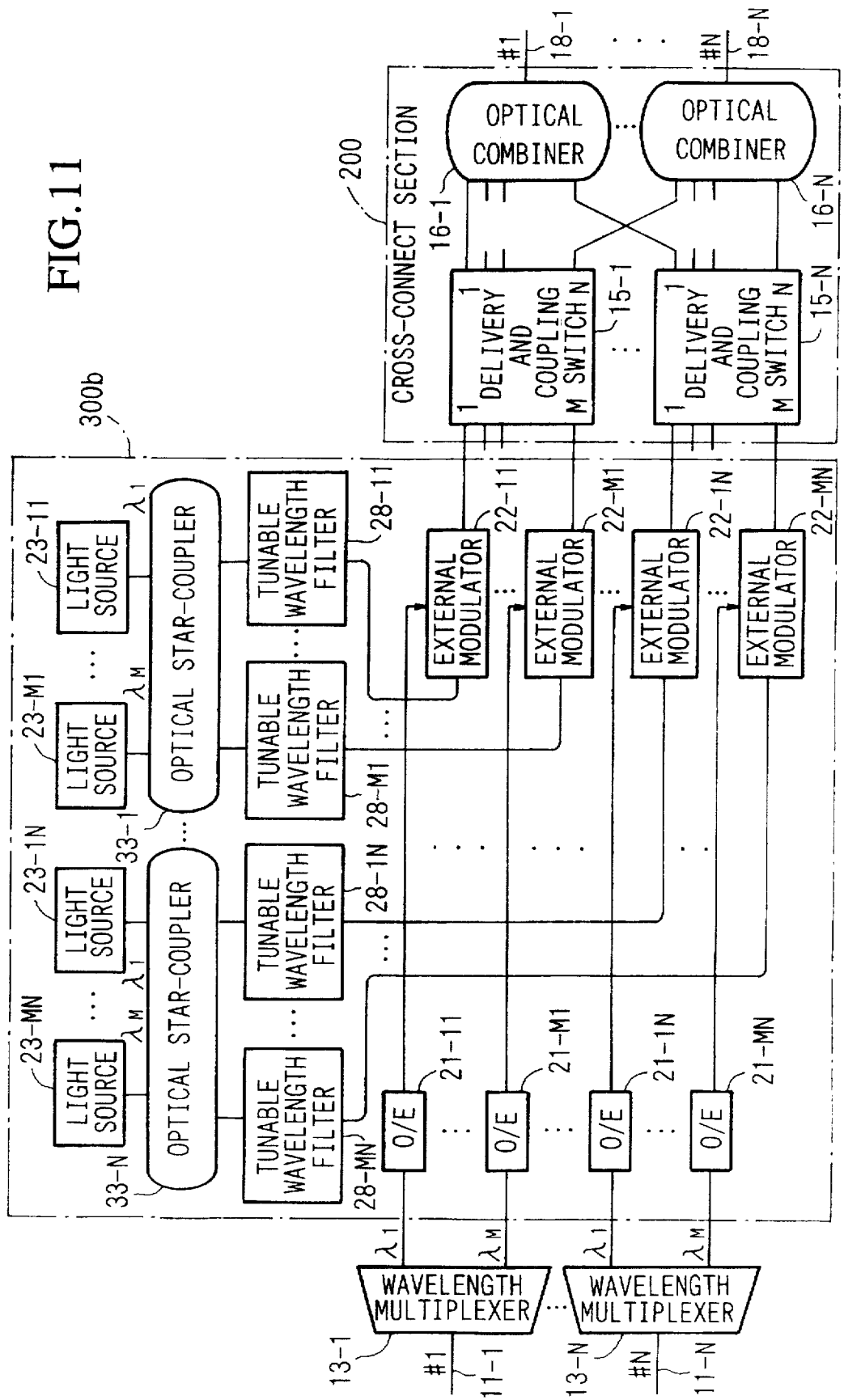
FIG. 11 is a block diagram showing a sixth-embodiment of an optical cross-connect system according to the present invention.

FIG. 11 shows a sixth embodiment of a VWP optical cross-connect system according to the present invention. In FIG. 11 wavelength division multiplexed signals of M wavelengths input from input optical fibers 11-j are demultiplexed into optical signals of respective wavelengths by wavelength demultiplexers 13-j. The optical signals of wavelength $\lambda_i$ are then converted into electrical signals by respective opto-electric conversion circuits (O/E) 21-ij, and input to the corresponding external modulators 22-ij. On the other hand, CW lights of wavelengths $\lambda_1$~$\lambda_M$ output from the light sources 23-ij~23-Mj in the wavelength conversion section 300b are wavelength division multiplexed by the M input M output optical star-couplers 33-j and then M divided. The wavelength division multiplexed CW lights divided by the M input M output optical star-couplers 33-j are input to tunable wavelength filters 28-lj~28-Mj, and respective CW lights of each wavelength are selected and input to the corresponding external modulators 22-lj~22-Mj. Here the wavelength division multiplexed communication light source used in the wavelength conversion of the M optical paths input from the input optical fibers 11-j, is constructed by the light sources 23-lj~23-Mj, the M input M output optical star-couplers 33-j, and the tunable wavelength filters 28-lj~28-Mj. The external modulators 22-ij modulate and output the CW light of wavelength $\lambda_s$ selected by the tunable wavelength filters 28-ij, using an electrical signal corresponding to the optical signals of wavelength $\lambda_i$ from the optical fiber 11-j. As a result, the wavelengths of optical signals are converted from wavelength $\lambda_i$ to wavelength $\lambda_s$. The wavelength converted optical signals are then cross-connected to the output optical fiber 18-j via the M input N output delivery and coupling switch 15-j and the N input 1 output optical combiner 16-j.

In this way, with the present embodiment, M fixed wavelength light sources (one wavelength division multiplexed communication light source) may be provided for the respective input optical fibers. Hence for the overall optical cross-connect system, correspondence is possible with only M×N fixed wavelength light sources (N wavelength division multiplexed communication light sources), thus enabling realization of an economical optical cross-connect system.

Figure 12:
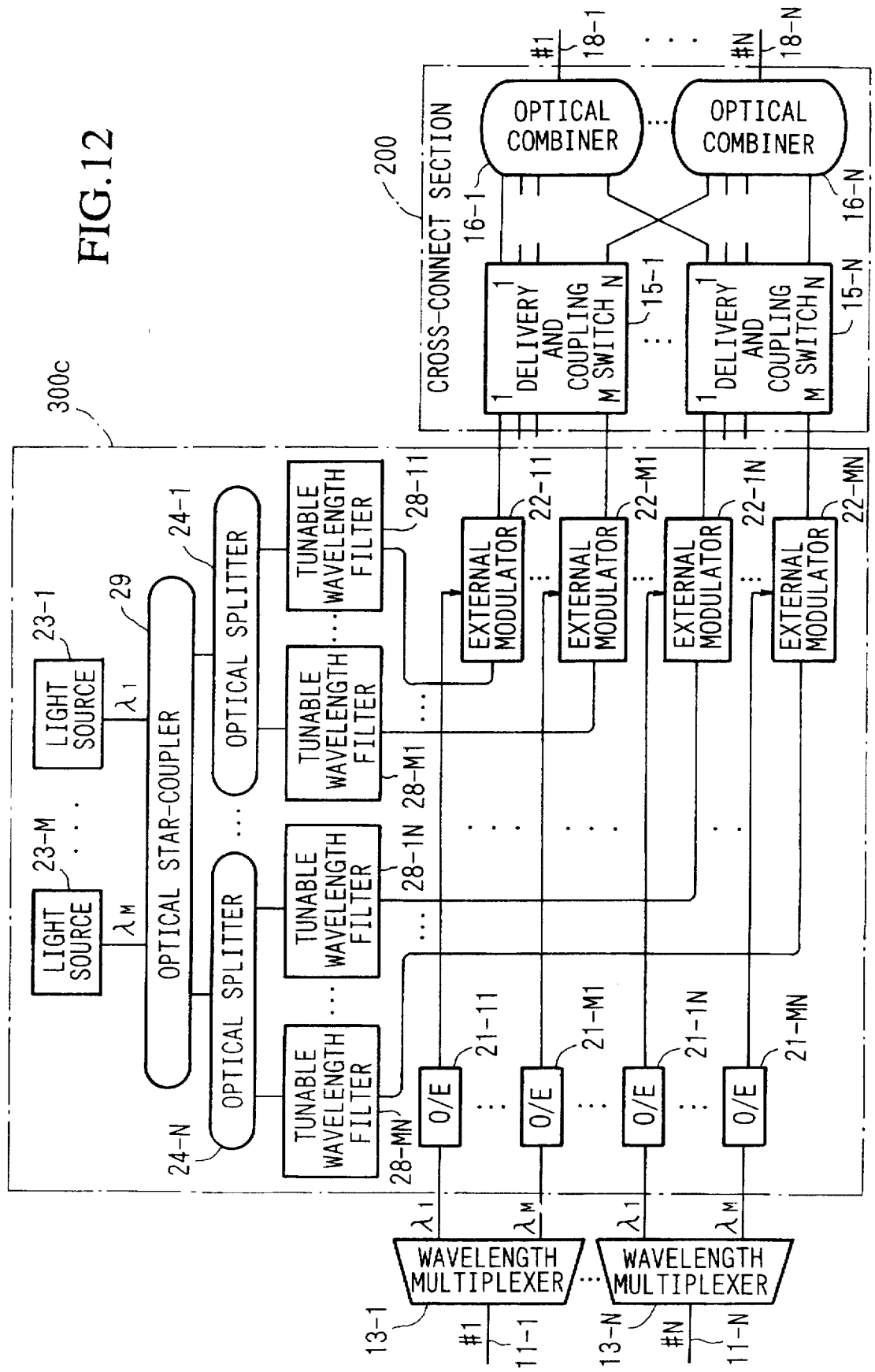
FIG. 12 is a block diagram showing a seventh embodiment of an optical cross-connect system according to the present invention.

FIG. 12 shows a seventh embodiment of an optical cross-connect system of the present invention. A feature of this embodiment is that in a wavelength conversion section 300c of FIG. 12, the same wavelength light sources inside the wavelength conversion section 300b in the embodiment of FIG. 6 are commonalized. The difference from the sixth embodiment shown in FIG. 11 is that the CW lights of wavelengths $\lambda_1$~$\lambda_M$ output from the light sources 23-l~23-M are wavelength division multiplexed and N divided by the M input N output optical star-coupler 29. The respective wavelength division multiplexed CW lights are then M divided by the one input M output optical splitters 24-j and input to the tunable wavelength filters 28-lj~28-Mj. In this way, the N same wavelength light sources corresponding to the respective input optical fibers can be made into one. Hence for the overall optical cross-connect system, correspondence is possible with only M fixed wavelength light sources, and in addition an economical optical cross-connect system can be realized.

In general, M fixed wavelength light sources (one wavelength division multiplexed communication light source) may be provided for K input optical fibers. Hence for the overall optical cross-connect system, correspondence is possible with only (N/K)×M fixed wavelength light sources (N/K wavelength division multiplexed communication light sources), thus enabling realization of an economical optical cross-connect system. The construction shown in FIG. 12 is for the case where K=N.

In the fourth through seventh embodiments, losses occurring in the 1 input M output optical splitters 24, the M input 1 output optical switches 25, the 1 input N output optical splitters 26, the M input M output optical star-couplers 33, the tunable wavelength filters 28, the M input N output optical star-coupler 29, and the external modulators 22, can be compensated for by providing optical amplifiers in the respective input lines or output lines. In this way, a predetermined signal-to-noise ratio (SNR) can be maintained. For the optical amplifiers, erbium-doped fiber amplifiers, semiconductor laser optical amplifiers, Raman amplifiers, Brillouin amplifiers or the like may be used. However, amplified spontaneous emission (ASE) is generated by the optical amplifiers, becoming a cause of degradation of the SNR.

Therefore, a tunable wavelength filter for eliminating the ASE is provided for example after the optical amplifier arranged in the output line from the external modulator 22.

Figure 13:
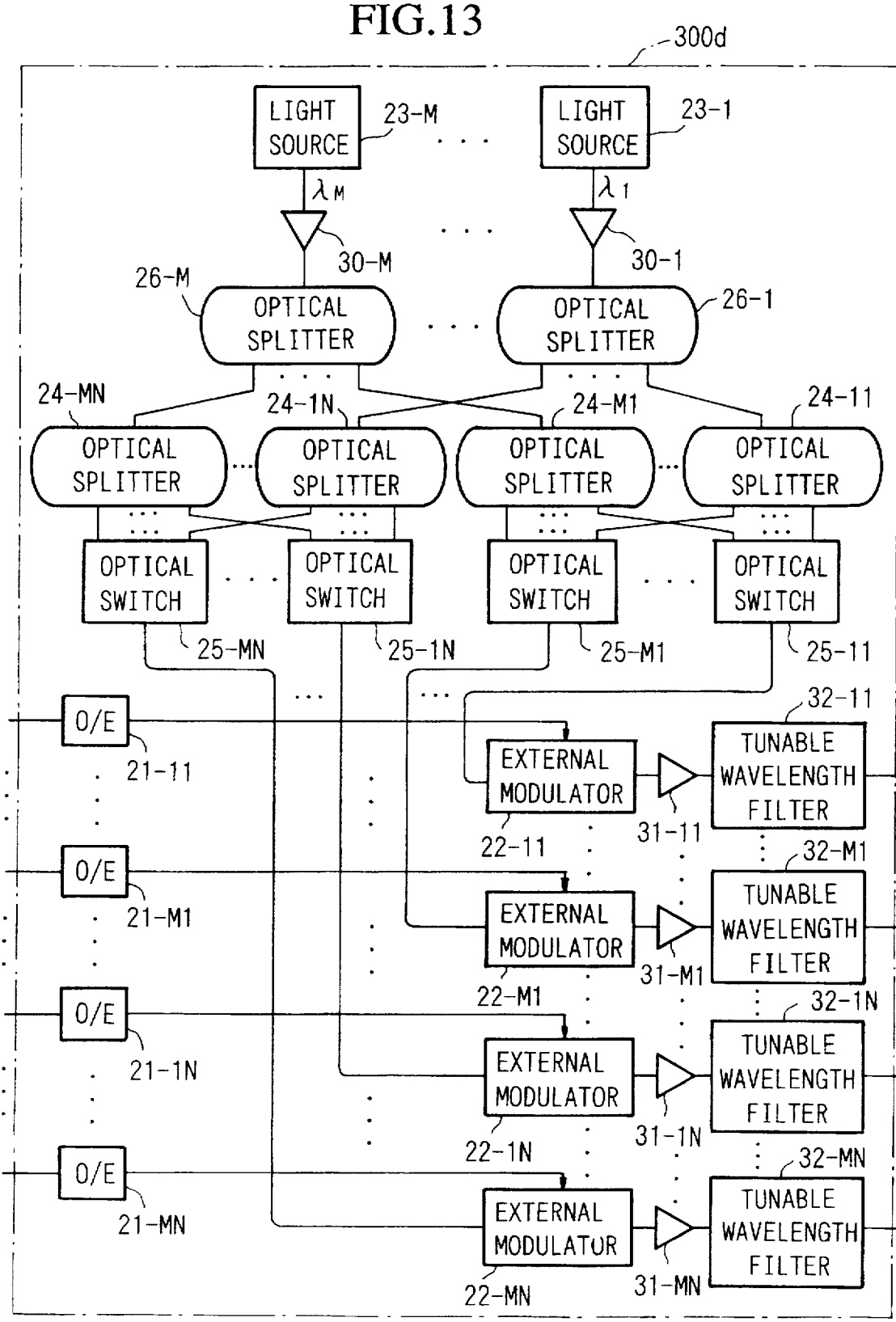
FIG. 13 is a diagram showing an example of a construction with optical amplifiers and tunable wavelength filters added to the wavelength conversion section in the fifth embodiment of the present invention.

FIG. 13 shows an example of a construction wherein optical amplifiers/tunable wavelength filters are added to the wavelength conversion section 300a of the fifth embodiment. In FIG. 13, optical amplifiers 30-l~30-M are arranged in the respective output lines from the light sources 23-l~23-M in a wavelength conversion section 300d. Moreover, optical amplifiers 31-ll~31-MN are arranged in the respective output lines from the external modulators 22-l~22-MN, and tunable wavelength filters 32-ll~32-MN are arranged after these. Central transmission wavelengths of the tunable wavelength filters 32-l~32-MN are set so as to respectively correspond to the wavelengths selected by M input 1 output optical switches 25-ll~25-MN. Consequently, if a device fitted with optical gate switches such as shown in FIG. 10A or FIG. 10B is used for the M input 1 output optical switches 25, then the ASE of the CW light of the desired wavelength (for example $\lambda_1$) can be eliminated by the tunable wavelength filters, and the ASE of CW lights other than the desired wavelength (for example other than $\lambda_1$) can be eliminated by the optical gate switches.

The tunable wavelength filters 32 used in this embodiment can also be arranged in other constructions of the embodiments such as the second embodiment described with reference to FIG. 2, subsequent to the optical amplifiers arranged prior or subsequent to the external modulators, and the same effect thus obtained.

Figure 14:
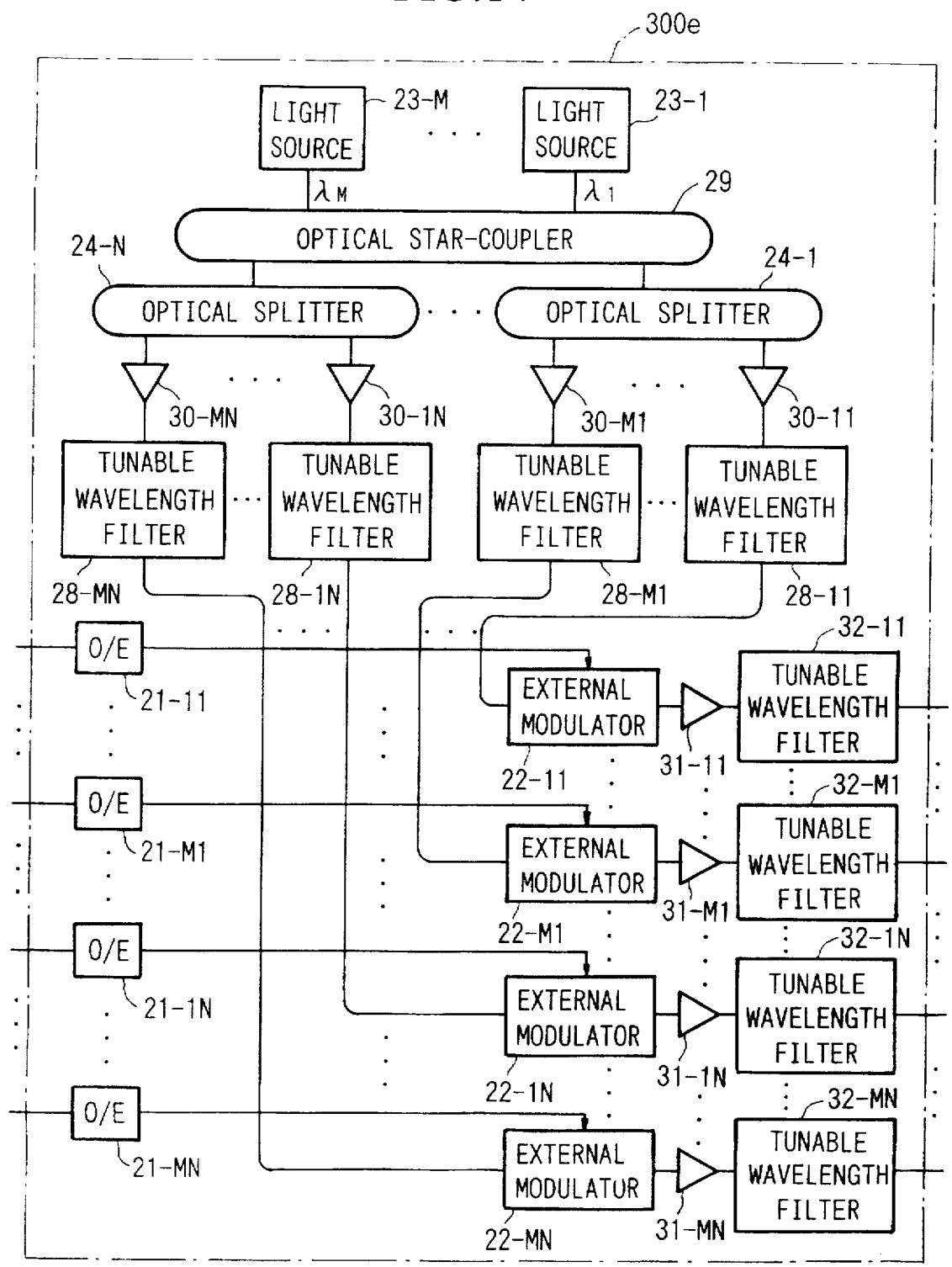
FIG. 14 is a diagram showing an example of a construction with optical amplifiers and tunable wavelength filters added to the wavelength conversion section in the seventh embodiment of the present invention.

FIG. 14 shows an example of a construction wherein optical amplifiers, and tunable wavelength filters are added to the wavelength conversion section 300c of the seventh embodiment. In FIG. 14, optical amplifiers 30-ll~30-MN are arranged in the respective output lines from the 1 input M output optical splitters 24-l~24-N. Moreover, optical amplifiers 31-ll~31-MN are arranged in the respective output lines from the external modulators 22-l~22-MN, and tunable wavelength filters 32-ll~32-MN are arranged after these. The center transmission wavelengths of the tunable wavelength filters 32-ll~32-MN are set so as to respectively correspond to the wavelengths selected by the tunable wavelength filters 28-ll~28-MN.

With the sixth and seventh embodiments also, as with the second embodiment described in relation to FIG. 2, optical amplifiers may be added to inside the wavelength conversion section 300d or 300e. Moreover, with the sixth and seventh embodiments also, as with the second embodiment, in the case wherein semiconductor optical amplifiers are used for the optical amplifiers, monitoring of the lights can be carried out using a pilot tone signal. At this time, in the wavelength conversion section 300d or 300e, by selecting with the M input 1 output optical switch 25, or the tunable wavelength filter 28, a desired wavelength from the CW light superimposed with the wavelength identifying pilot tone, and then monitoring for the pilot tone signal, it is possible to monitoring whether or not the desired wavelength has been selected.

We claim:

1. An optical cross-connect system comprising:

wavelength demultiplexing means for demultiplexing wavelength division multiplexed signals of M wavelengths, M being an integer of two or more, respectively input from N, N being an integer of two or more, input optical transmission lines, into M×N optical signals of respective wavelengths;

optical regenerating means for regenerating and outputting the M×N optical signals of the respective wavelengths demultiplexed by the wavelength demultiplexing means, said optical regenerating means comprising: M light sources in K sets, K being one or more and less than N/2 with divisor of N, for outputting lights of mutually different wavelengths; M×K optical splitters for respectively N/K dividing the lights from said light sources and outputting N lights for each wavelength; M×N opto-electrical converters for converting said M×N optical signals of the respective wavelengths into electrical signals, and M×N external modulators for corresponding the electrical signals for the converted M×N optical signals of respective wavelengths, with the N lights for each of the respective wavelengths divided by said M×N optical splitters, and modulating the corresponding wavelength lights by the electrical signals and then outputting; and (M×N) input N output cross-connect means for rearranging the routing for the M×N regenerated optical signals and outputting to any of N output optical transmission lines.

2. An optical cross-connect system according to claim 1, wherein optical amplifiers are provided subsequent to said light sources and prior to or subsequent to said external modulators.

3. An optical cross-connect system according to claim 2, wherein the optical amplifiers provided subsequent to said light sources utilize semiconductor optical amplifiers, and when the light is amplified, superimpose thereon modulation components characteristic of the respective wavelengths.

4. An optical cross-connect system according to claim 2, wherein the optical amplifiers provided prior to or subsequent to said external modulators utilize semiconductor optical amplifiers, and when the light is amplified, superimpose thereon modulation components characteristic of the input optical transmission lines.

5. An optical cross-connect system according to any one of claims 1 through 4, wherein a stabilizing circuit is provided for monitoring the wavelength or the frequency of the respective light sources and stabilizing this at a predetermined respective wavelength or frequency.

6. An optical cross-connect system comprising:

wavelength demultiplexing means for demultiplexing wavelength division multiplexed signals of M wavelengths, M being an integer of two or more, respectively input from N, N being an integer of two or more, input optical transmission lines, into M×N optical signals of respective wavelengths. wavelength replacing means for wavelength replacing and regenerating and then outputting the M×N optical signals of the respective wavelengths demultiplexed by the demultiplexing means, said wavelength replacing means comprising: M light sources in K sets, K being the divisor of N, for outputting lights of mutually different wavelengths; M×K optical splitters for respectively N/K dividing the lights from said light sources and outputting N lights for each wavelength; N optical space switches into which are respectively input 1 set of M wavelength lights from N sets of M wavelength lights output from said M×K optical splitters, for consecutively replacing the input lights and respectively outputting M wavelength lights; M×N opto-electrical converters for converting said M×N optical signals of the respective wavelengths into electrical signals; and M×N external modulators for corresponding the electrical signals for the converted M×N optical signals of respective wavelengths, with the N lights for each of the respective wavelengths output from said N optical space switches, and modulating the corresponding wavelength lights by the electrical signals and then outputting; and (M×N) input N output cross-connect means for rearranging the routing for the M×N optical signals output from said wavelength conversion means, and outputting to any of N output optical transmission lines.

7. An optical cross-connect system according to claim 6 wherein said optical space switch comprises a plurality of optical gate switches, and transfer of cross-talk components is prevented by having the optical gate switch passing optical signals ON, and the optical gate switches not passing optical signals OFF.

8. An optical cross-connect system according to either one of claim 6 and claim 7, wherein a stabilizing circuit is provided for monitoring the wavelength or the frequency of the respective light sources and stabilizing this at a predetermined respective wavelength or frequency.

9. An optical cross-connect system according to either one of claim 6 and claim 7, wherein said wavelength replacing means comprises; optical amplifiers provided subsequent to said light sources and prior to or subsequent to said external modulators, and tunable wavelength filters provided subsequent to said optical amplifiers provided prior to or subsequent to said external modulators.

10. An optical cross-connect system according to either one of claim 6 and claim 7, wherein said wavelength replacing means comprises; optical amplifiers provided subsequent to said light sources and prior to or subsequent to said external modulators, and tunable wavelength filters provided subsequent to said optical amplifiers provided prior to or subsequent to said external modulators, and wherein the optical amplifiers provided subsequent to said light sources utilize semiconductor optical amplifiers, and when the light is amplified, superimpose thereon modulation components characteristic of the respective wavelengths.

11. An optical cross-connect system according to either one of claim 6 and claim 7, wherein said wavelength replacing means comprises; optical amplifiers provided subsequent to said light sources and prior to or subsequent to said external modulators, and tunable wavelength filters provided subsequent to said optical amplifiers provided prior to or subsequent to said external modulators, and wherein the optical amplifiers provided prior to or subsequent to said external modulators utilize semiconductor optical amplifiers, and when the light is amplified, superimpose thereon modulation components characteristic of the input optical transmission lines.

12. An optical cross-connect system comprising:

N wavelength demultiplexing means for demultiplexing wavelength division multiplexed signals of M wavelengths, M being an integer of two or more, respectively input from N, N being an integer of two or more, input optical transmission lines, into M×N optical signals of respective wavelengths, wavelength conversion means for wavelength converting and then outputting the M×N optical signals of the respective wavelengths demultiplexed by the N wavelength demultiplexing means, said wavelength conversion means comprising:

either one of;

N light source sections corresponding to the N input optical transmission lines and incorporating:

M light sources for outputting lights of mutually different fixed wavelengths;

M input M output optical star-couplers for wavelength multiplexing and M dividing the optical outputs from said light sources, and M tunable wavelength filters into which are input the wavelength multiplexed lights divided by said M input M output optical star-couplers, which pass lights of predetermined wavelength only and which shut-off lights of other wavelengths, and N/K, where K is the divisor of N, light source sections corresponding to the N input optical transmission lines and incorporating:

M light sources for outputting lights of mutually different fixed wavelengths;

M input K output optical star-couplers for wavelength multiplexing and K dividing the optical outputs from said light sources, 1 input M output optical splitters for respectively M dividing the wavelength multiplexed lights divided by said M input K output optical star-couplers, and M×K tunable wavelength filters into which are input the wavelength multiplexed lights divided by said 1 input M output optical splitters, which pass lights of predetermined wavelength only and which shut-off lights of other wavelengths, M×N opto-electric converters for converting the optical signals of respective wavelengths demultiplexed by said demultiplexing means, into electrical signals, and M×N external modulators for corresponding the M×N electrical signals output from said respective opto-electric converters with the M×N lights of respective wavelengths output from the respective tunable wavelength filters of said light source sections, and modulating the corresponding wavelengths lights by the electrical signals and then outputting, and (M×N) input N output cross-connect means for rearranging the routing for said M×N wavelength converted optical signals, and outputting to any of N output optical transmission lines.

13. An optical cross-connect system comprising:

N wavelength demultiplexing means for demultiplexing wavelength division multiplexed signals of M wavelengths, M being an integer of two or more, respectively input from N, N being an integer of two or more, input optical transmission lines, into M×N optical signals of respective wavelengths, wavelength conversion means for wavelength converting and then outputting the M×N optical signals of the respective wavelengths demultiplexed by the N wavelength demultiplexing means, said wavelength conversion means comprising:

either one of;

N light source sections corresponding to the N input optical transmission lines and incorporating:

M light sources for outputting lights of mutually different fixed wavelengths;

M sets of 1 input M output optical splitters for respectively M dividing the optical outputs from said light sources, and M sets of M input 1 output optical switches into which are input the lights of respective wavelengths divided by said respective 1 input M output optical splitters, which select and output lights of one of the wavelengths, and N/K, where K is the divisor of N, light source sections corresponding to the N input optical transmission lines and incorporating:

M light sources for outputting lights of mutually different fixed wavelengths;

M sets of 1 input K output optical splitters for respectively K dividing the optical outputs from said light sources, M×K sets of 1 input K output optical splitters for respectively M dividing the lights divided by said respective 1 input K output optical splitters, and M×K sets of M input 1 output optical switches into which are input the lights of respective wavelengths divided by said respective 1 input M output optical splitters, which select and output lights of one of the wavelengths.

M×N opto-electric converters for converting the optical signals of respective wavelengths demultiplexed by said demultiplexing means, into electrical signals, and M×N external modulators for corresponding the M×N electrical signals output from said respective opto-electric converters with the M×N lights of respective wavelengths output from the respective M input 1 output optical switches of said light sources, and modulating the corresponding wavelengths lights by the electrical signals and then outputting, and (M×N) input N output cross-connect means for rearranging the routing for said M×N wavelength converted optical signals, and outputting to any of N output optical transmission lines.

14. An optical cross-connect system according to claim 13 wherein optical gate switches are provided at the input stage of said M input 1 output optical switch, and transfer of cross-talk components is prevented by having the optical gate switch for the input line carrying the optical signals ON, and the optical gate switch for the other output lines OFF.

15. An optical cross-connect system according to any one of claim 12 through claim 14, wherein a stabilizing circuit is provided for monitoring the wavelength or the frequency of the respective light sources, and stabilizing this at a predetermined respective wavelength or frequency.

16. An optical cross-connect system according to any one of claim 12 through claim 14, wherein said wavelength conversion means comprises; optical amplifiers provided subsequent to said light sources and prior to or subsequent to said external modulators, and tunable wavelength filters provided subsequent to said optical amplifiers provided prior to or subsequent to said external modulators.

17. An optical cross-connect system according to any one of claim 12 through claim 14, wherein said wavelength conversion means comprises; optical amplifiers provided subsequent to said light sources and prior to or subsequent to said external modulators, and tunable wavelength filters provided subsequent to said optical amplifiers provided prior to or subsequent to said external modulators, and wherein the optical amplifiers provided subsequent to said light sources utilize semiconductor optical amplifiers, and when the light is amplified, superimpose thereon modulation components characteristic of the respective wavelengths.

18. An optical cross-connect system according to any one of claim 12 through claim 14, wherein said wavelength conversion means comprises; optical amplifiers provided subsequent to said light sources and prior to or subsequent to said external modulators, and tunable wavelength filters provided subsequent to said optical amplifiers provided prior to or subsequent to said external modulators, and wherein the optical amplifiers provided prior to or subsequent to said external modulators utilize semiconductor optical amplifiers, and when the light is amplified, superimpose thereon modulation components characteristic of the input optical transmission lines.

* * * * *